(12) United States Patent
Kim

(10) Patent No.: US 12,205,590 B2
(45) Date of Patent: Jan. 21, 2025

(54) ELECTRONIC DEVICE AND METHOD OF OUTPUTTING OBJECT GENERATED BASED ON DISTANCE BETWEEN ELECTRONIC DEVICE AND TARGET DEVICE

(71) Applicant: SAMSUNG ELECTRONICS CO., LTD., Suwon-si (KR)

(72) Inventor: Hyeonjeong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 277 days.

(21) Appl. No.: 17/867,280

(22) Filed: Jul. 18, 2022

(65) Prior Publication Data

US 2022/0415323 A1  Dec. 29, 2022

Related U.S. Application Data

(63) Continuation of application No. PCT/KR2022/005702, filed on Apr. 21, 2022.

(30) Foreign Application Priority Data

Jun. 25, 2021 (KR) .......................... 10-2021-0083232

(51) Int. Cl.
*G10L 15/22* (2006.01)
*G10L 15/26* (2006.01)
(Continued)

(52) U.S. Cl.
CPC .............. *G10L 15/22* (2013.01); *G10L 15/26* (2013.01); *H04W 4/023* (2013.01); *H04W 4/80* (2018.02)

(58) Field of Classification Search
None
See application file for complete search history.

(56) References Cited

U.S. PATENT DOCUMENTS 7,725,307 B2 * 5/2010 Bennett ............. G06F 16/24522
704/238
9,251,787 B1 * 2/2016 Hart ........................ G10L 15/20
(Continued)

FOREIGN PATENT DOCUMENTS

KR    10-2010-0069346    6/2010
KR    10-2014-0079328    6/2014
(Continued)

OTHER PUBLICATIONS

International Search Report for PCT/KR2022/005702 dated Aug. 3, 2022, 3 pages.

*Primary Examiner* — Neeraj Sharma
(74) *Attorney, Agent, or Firm* — Nixon & Vanderhye, P.C.

(57) ABSTRACT

According to an example embodiment, an electronic device includes: a memory storing instructions and a processor electrically connected to the memory and configured to execute the instructions. The instructions, when executed by the processor, cause the processor to: determine whether an utterance is a device-controlling utterance for a target device to be remotely controlled, verify a distance between the electronic device and the target device based on the utterance being the device-controlling utterance, and output an object generated differently based on whether the distance is a short distance less than or equal to a specified distance or a long distance greater than the specified distance.

17 Claims, 14 Drawing Sheets

(51) Int. Cl.
*H04W 4/02* (2018.01)
*H04W 4/80* (2018.01)

(56) References Cited

U.S. PATENT DOCUMENTS

| | | | |
|---|---|---|---|
| 9,990,176 B1 * | 6/2018 | Gray | G06F 16/957 |
| 10,332,523 B2 * | 6/2019 | Leong | G10L 15/22 |
| 2010/0046766 A1 * | 2/2010 | Gregg | H04R 3/12 |
| | | | 381/59 |
| 2014/0250245 A1 | 9/2014 | Pahud et al. | |
| 2014/0337607 A1 * | 11/2014 | Peterson | G06F 9/4401 |
| | | | 713/1 |
| 2016/0035351 A1 * | 2/2016 | Sendai | G02B 27/017 |
| | | | 704/275 |
| 2017/0236515 A1 * | 8/2017 | Pinsky | G02B 27/0172 |
| | | | 704/275 |
| 2018/0350405 A1 * | 12/2018 | Marco | G11B 27/031 |
| 2019/0050061 A1 * | 2/2019 | Børstad | G06F 3/017 |
| 2019/0147853 A1 * | 5/2019 | Gunasekara | G06F 40/216 |
| | | | 704/243 |
| 2020/0167597 A1 | 5/2020 | Nguyen et al. | |
| 2021/0057113 A1 | 2/2021 | Ni et al. | |
| 2021/0174796 A1 * | 6/2021 | Chae | G10L 15/187 |
| 2021/0328824 A1 * | 10/2021 | Strutt | G01S 15/88 |
| 2022/0157321 A1 * | 5/2022 | Sharifi | G10L 17/22 |

FOREIGN PATENT DOCUMENTS

| | | |
|---|---|---|
| KR | 10-2015-0113701 | 10/2015 |
| KR | 10-2017-0081390 | 7/2017 |
| KR | 10-2018-0126946 | 11/2018 |
| KR | 10-2019-0068182 | 6/2019 |
| KR | 10-2019-0093528 | 8/2019 |
| KR | 10-2020-0049020 | 5/2020 |

\* cited by examiner

ELECTRONIC DEVICE AND METHOD OF OUTPUTTING OBJECT GENERATED BASED ON DISTANCE BETWEEN ELECTRONIC DEVICE AND TARGET DEVICE

CROSS-REFERENCE TO RELATED APPLICATIONS

This application is a continuation of International Application No. PCT/KR2022/005702 designating the United States, filed on Apr. 21, 2022, in the Korean Intellectual Property Receiving Office and claiming priority to Korean Patent Application No. 10-2021-0083232 filed on Jun. 25, 2021, in the Korean Intellectual Property Office, the disclosures of which are incorporated by reference herein in their entireties.

BACKGROUND

1. Field

The disclosure relates to an electronic device and a method of outputting an object generated based on a distance between the electronic device and a target device.

2. Description of Related Art

Advancement in multimedia technology and network technology has enabled users to receive a variety of services using electronic devices. For example, as speech recognition technology has advanced, a user may input his/her voice (e.g., utterance) to an electronic device and receive a response message in response to the input voice through a voice assistant (e.g., a voice assistant service).

The electronic device may perform functions of the electronic device or support another electronic device in performing the functions based on the input voice recognized through the voice assistant.

SUMMARY

When a user inputs, to a remote device (e.g., a target device to be remotely controlled), a remote command for controlling the remote device using an electronic device, the user may receive only one object (e.g., a user interface (UI)) provided without consideration of a distance between the user and the remote device and may thus experience a limited sense of use. Thus, there is a desire for a technology for providing a user with an object optimized according to a situation where the user needs a remote device.

Embodiments of the disclosure provide a technology for generating and providing an object corresponding to a short distance and/or long distance based on a distance between an electronic device and a remote device which is a target device to be remotely controlled.

Embodiments of the disclosure provide a technology for providing an object to a user based on a short distance and/or long distance and improving an experience of using a voice assistant.

However, technical aspects are not limited to the foregoing aspects, and other technical aspects may also be present. Additional aspects of the example embodiments of the disclosure will be set forth in part in the description with follows and, in part, will be apparent from the description.

According to an example embodiment, an electronic device includes: a memory storing instructions, and a processor electrically connected to the memory and configured to execute the instructions. When the instructions, when executed by the processor, cause the processor to: determine whether an utterance is a device-controlling utterance for a target device to be remotely controlled, verify a distance between the electronic device and the target device based on the utterance being the device-controlling utterance, and output an object generated differently based on whether the distance is a short distance (e.g., less than or equal to a threshold distance) or a long distance (e.g., greater than a threshold distance).

According to an example embodiment, a method of operating an electronic device includes: determining whether an utterance is a device-controlling utterance for a target device to be remotely controlled, verifying a distance between the electronic device and the target device based on the utterance being the device-controlling utterance, and outputting an object generated differently based on whether the distance is a short (e.g., less than or equal to a threshold distance) distance or a long distance (e.g., greater than a threshold distance).

According to various example embodiments described herein, an object corresponding to a short and/or long distance may be generated based on a distance between an electronic device and a target device to be remotely controlled and the generated object may be provided to a user, and the user may thus experience an improved sense of use of a voice assistant.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
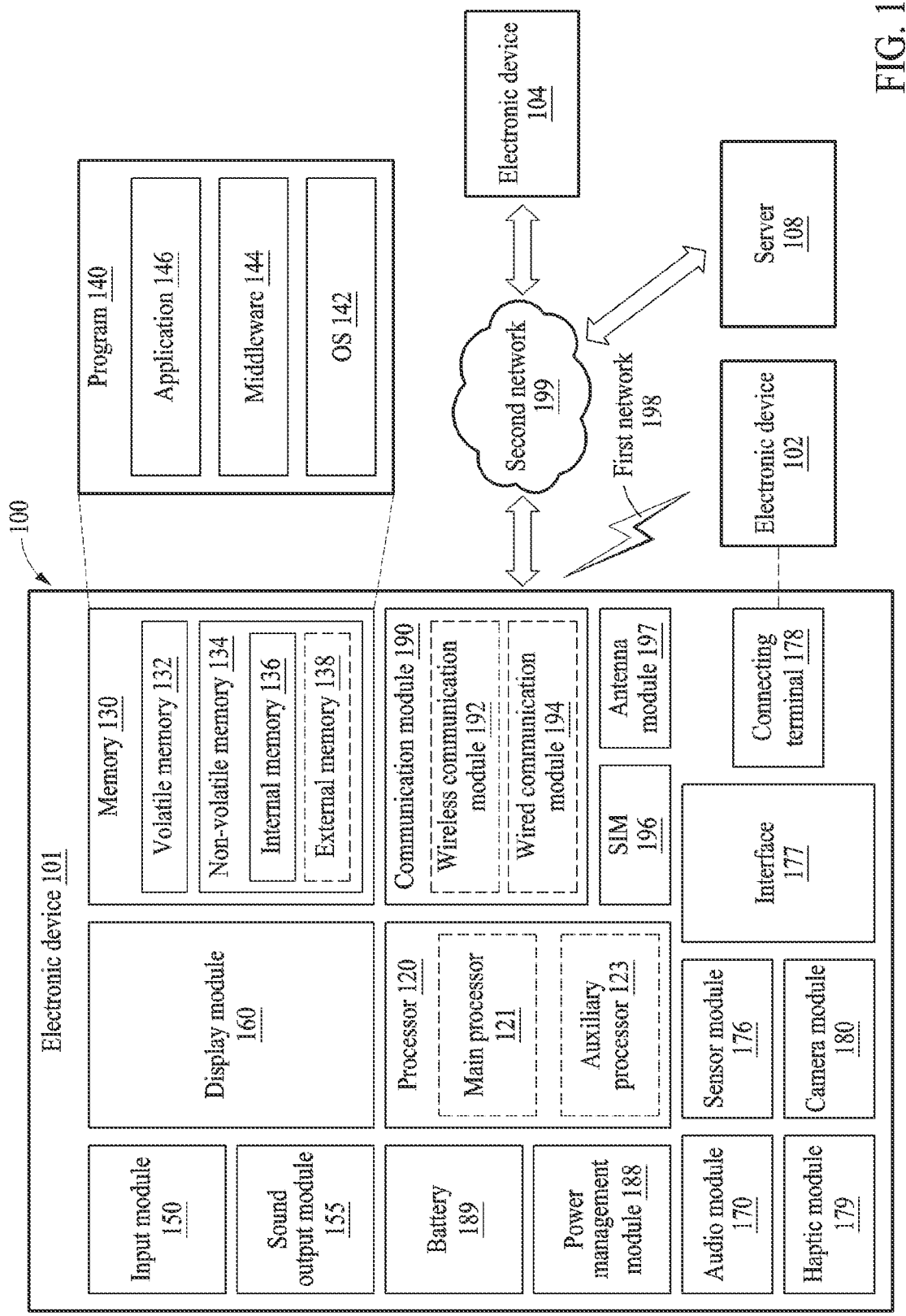
FIG. 1 is a block diagram illustrating an example electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various example embodiments. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101.

The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device described herein may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be understood that certain embodiments of the present disclosure and the terms used therein are not intended to limit the technological features set forth herein to some particular embodiments but include various changes, equivalents, or replacements of the embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with certain embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Certain embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to certain embodiments, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
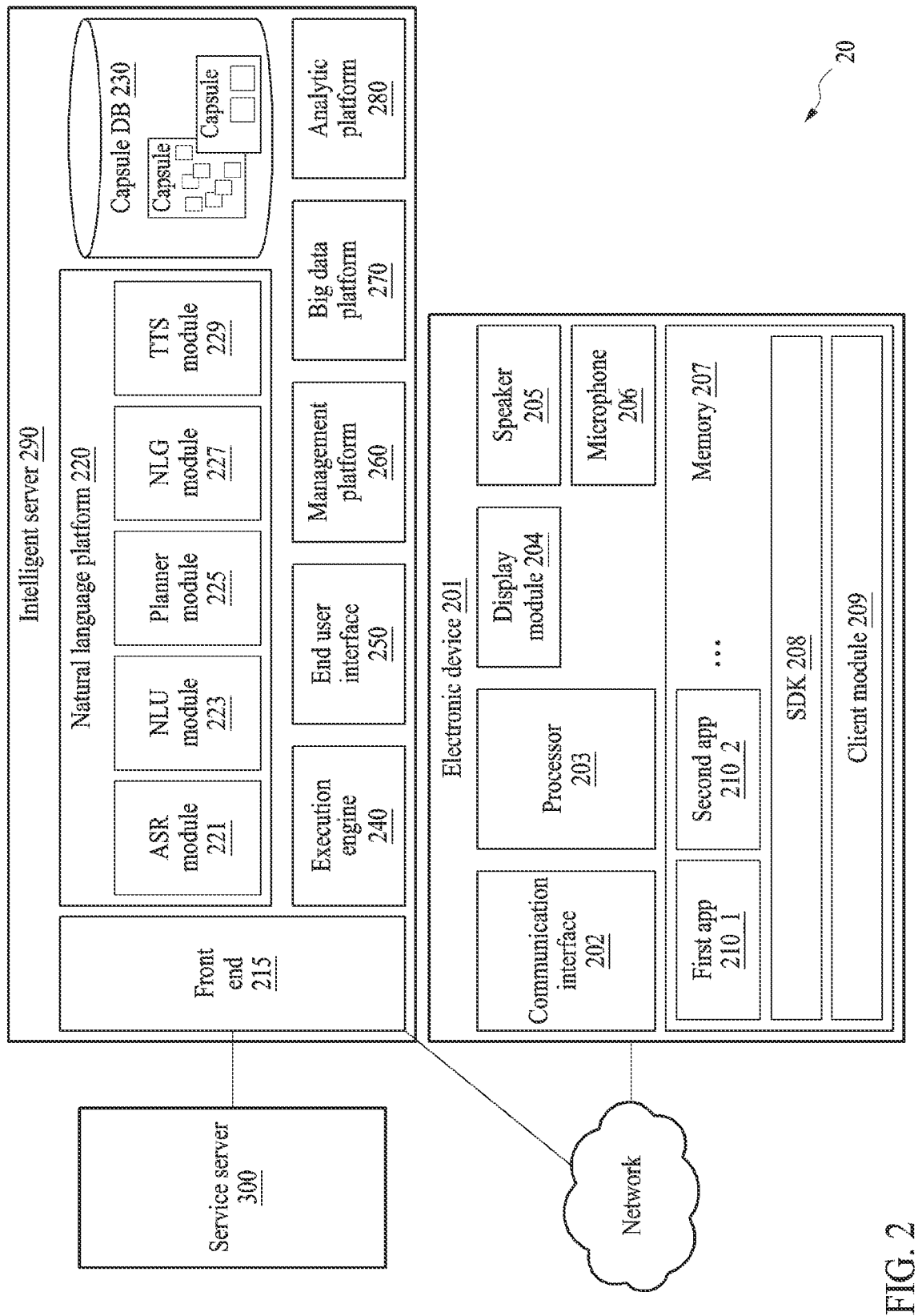
FIG. 2 is a block diagram illustrating an example integrated intelligence system according to various example embodiments.

FIG. 2 is a block diagram illustrating an example integrated intelligence system according to various example embodiments.

Referring to FIG. 2, according to an example embodiment, an integrated intelligence system 20 may include an electronic device 201 (e.g., the electronic device 101 of FIG. 1), an intelligent server 290 (e.g., the server 108 of FIG. 1), and a service server 300 (e.g., the server 108 of FIG. 1).

The electronic device 201 may be a terminal device (or an electronic device) that is connectable to the Internet, for example, and without limitation, a mobile phone, a smartphone, a personal digital assistant (PDA), a laptop computer, a television (TV), a white home appliance, a wearable device, a head-mounted display (HMD), a smart speaker, or the like.

As illustrated, the electronic device 201 may include a communication interface (e.g., including communication circuitry) 202 (e.g., the interface 177 of FIG. 1), a microphone 206 (e.g., the input module 150 of FIG. 1), a speaker 205 (e.g., the sound output module 155 of FIG. 1), a display module (e.g., including a display) 204 (e.g., the display module 160 of FIG. 1), a memory 207 (e.g., the memory 130 of FIG. 1), and/or a processor (e.g., including processing circuitry) 203 (e.g., the processor 120 of FIG. 1). The components listed above may be operationally or electrically connected to each other.

The communication interface 202 may be connected to an external device and may include various communication circuitry to transmit and receive data to and from the external device. The microphone 206 may receive a sound (e.g., a user utterance) and convert the sound into an electrical signal. The speaker 205 may output the electrical signal as a sound (e.g., a voice or speech).

The display module 204 may include a display and display an image or video. The display module 204 may also display a graphical user interface (GUI) of an app (or an application program) being executed. The display module 204 may receive a touch input through a touch sensor. For example, the display module 204 may receive a text input through the touch sensor in an on-screen keyboard area displayed on the display module 204.

The memory 207 may store a client module 209, a software development kit (SDK) 208, and a plurality of apps 210. The client module 209 and the SDK 208 may configure a framework (or a solution program) for performing general-purpose functions. In addition, the client module 209 or the SDK 208 may configure a framework for processing a user input (e.g., a voice input, a text input, and a touch input).

The apps 210 stored in the memory 207 may be programs for performing designated functions. The apps 210 may include a first app 210_1, a second app 210_2, and the like. The apps 210 may each include a plurality of actions for performing a designated function. For example, the apps 210 may include an alarm app, a message app, and/or a scheduling app. The apps 210 may be executed by the processor 203 to sequentially execute at least a portion of the actions.

The processor 203 may include various processing circuitry and control the overall operation of electronic device 201. For example, the processor 203 may be electrically connected to the communication interface 202, the microphone 206, the speaker 205, and the display module 204 to perform a designated operation.

The processor 203 may also perform a designated function by executing a program stored in the memory 207. For example, the processor 203 may execute at least one of the client module 209 or the SDK 208 to perform the following operations for processing a user input. For example, the processor 203 may control the actions of the apps 210 through the SDK 208. The following operations described as operations of the client module 209 or the SDK 208 may be operations to be performed by the execution of the processor 203.

The client module 209 may receive a user input. For example, the client module 209 may receive a voice signal (or an audio signal) corresponding to a user utterance sensed through the microphone 206. The client module 209 may receive a touch input sensed through the display module 204. Alternatively, the client module 209 may receive a text input sensed through a keyboard or an on-screen keyboard. The client module 209 may also receive, as non-limiting examples, various types of user input sensed through an input module included in the electronic device 201 or an input module connected to the electronic device 201. The client module 209 may transmit the received user input to the intelligent server 290. The client module 209 may transmit state information of the electronic device 201 together with the received user input to the intelligent server 290. The state information may be, for example, execution state information of an app.

The client module 209 may also receive a result corresponding to the received user input. For example, when the intelligent server 290 is capable of calculating the result corresponding to the received user input, the client module 209 may receive the result corresponding to the received user input. The client module 209 may display the received result on the display module 204, and output the received result in audio through the speaker 205.

The client module 209 may receive a plan corresponding to the received user input. The client module 209 may display, on the display module 204, execution results of executing a plurality of actions of an app according to the plan. For example, the client module 209 may sequentially display the execution results of the actions on the display module 204, and output the execution results in audio through the speaker 205. For another example, electronic device 201 may display only an execution result of executing a portion of the actions (e.g., an execution result of the last action) on the display module 204, and output the execution result in audio through the speaker 205.

The client module 209 may receive a request for obtaining information necessary for calculating the result corresponding to the user input from the intelligent server 290. The client module 209 may transmit the necessary information to the intelligent server 290 in response to the request.

The client module 209 may transmit information on the execution results of executing the actions according to the plan to the intelligent server 290. The intelligent server 290 may verify that the received user input has been correctly processed using the information.

The client module 209 may include a speech recognition module. The client module 209 may recognize a voice input for performing a limited function through the speech recognition module. For example, the client module 209 may execute an intelligent app for processing a voice input to perform an organic action through a designated input (e.g., Wake up!).

The intelligent server 290 may receive information related to a user voice input from the electronic device 201 through a communication network. The intelligent server 290 may change data related to the received voice input into text data. The intelligent server 290 may generate a plan for performing a task corresponding to the user input based on the text data.

The plan may be generated by an artificial intelligence (AI) system. The AI system may be a rule-based system or a neural network-based system (e.g., a feedforward neural network (FNN) or a recurrent neural network (RNN)). The AI system may be a combination thereof or another AI system. The plan may also be selected from a set of predefined plans or may be generated in real time in response to a user request. For example, the AI system may select at least one plan from among the predefined plans.

The intelligent server 290 may transmit a result according to the generated plan to the electronic device 201 or transmit the generated plan to the electronic device 201. The electronic device 201 may display the result according to the plan on the display module 204. The electronic device 201 may display a result of executing an action according to the plan on the display module 204.

The intelligent server 290 may include a front end 215, a natural language platform 220, a capsule database (DB) 230, an execution engine 240, an end user interface 250, a management platform 260, a big data platform 270, or an analytic platform 280.

The front end 215 may receive a user input from the electronic device 201. The front end 215 may transmit a response corresponding to the user input.

The natural language platform 220 may include an automatic speech recognition (ASR) module 221, a natural language understanding (NLU) module 223, a planner module 225, a natural language generator (NLG) module 227, or a text-to-speech (TTS) module 229. Each of these modules may include various processing circuitry and/or executable program instructions.

The ASR module 221 may convert a voice input received from the electronic device 201 into text data. The NLU module 223 may understand an intention of a user using the text data of the voice input. For example, the NLU module 223 may understand the intention of the user by performing a syntactic or semantic analysis on a user input in the form of text data. The NLU module 223 may understand semantics of a word extracted from the user input using a linguistic feature (e.g., a grammatical element) of a morpheme or phrase, and determine the intention of the user by matching the semantics of the word to the intention.

The planner module 225 may generate a plan using the intention and a parameter determined by the NLU module 223. The planner module 225 may determine a plurality of domains required to perform a task based on the determined intention. The planner module 225 may determine a plurality of actions included in each of the domains determined based on the intention. The planner module 225 may determine a parameter required to execute the determined actions or a resulting value output by the execution of the actions. The parameter and the resulting value may be defined as a concept of a designated form (or class). Accordingly, the plan may include a plurality of actions and a plurality of concepts determined by a user intention. The planner module 225 may determine a relationship between the actions and the concepts stepwise (or hierarchically). For example, the planner module 225 may determine an execution order of the actions determined based on the user intention, based on the concepts. In other words, the planner module 225 may determine the execution order of the actions based on the parameter required for the execution of the actions and results output by the execution of the actions. Accordingly, the planner module 225 may generate the plan including connection information (e.g., ontology) between the actions and the concepts. The planner module 225 may generate the plan using information stored in the capsule DB 230 that stores a set of relationships between concepts and actions.

The NLG module 227 may change designated information to the form of a text. The information changed to the form of a text may be in the form of a natural language utterance. The TTS module 229 may change the information in the form of a text to information in the form of a speech.

According to an embodiment, all or some of the functions of the natural language platform 220 may also be implemented in the electronic device 201.

The capsule DB 230 may store therein information about relationships between a plurality of concepts and a plurality of actions corresponding to a plurality of domains. According to an embodiment, a capsule may include a plurality of action objects (or action information) and concept objects (or concept information) included in a plan. The capsule DB 230 may store a plurality of capsules in the form of a concept action network (CAN). The capsules may be stored in a function registry included in the capsule DB 230.

The capsule DB 230 may include a strategy registry that stores strategy information necessary for determining a plan corresponding to a user input, for example, a voice input. The strategy information may include reference information for determining one plan when there are a plurality of plans corresponding to the user input. The capsule DB 230 may include a follow-up registry that stores information on follow-up actions for suggesting a follow-up action to the user in a designated situation. The follow-up action may include, for example, a follow-up utterance. The capsule DB 230 may include a layout registry that stores layout information of information output through the electronic device 201. The capsule DB 230 may include a vocabulary registry that stores vocabulary information included in capsule information. The capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a currently set objective, a preference of the user, or an environmental condition. The capsule DB 230 may also be implemented in the electronic device 201.

The execution engine 240 may include various processing circuitry and/or executable program instructions and calculate a result using a generated plan. The end user interface 250 may transmit the calculated result to the electronic device 201. Accordingly, the electronic device 201 may receive the result and provide the received result to the user. The management platform 260 may include various processing circuitry and/or executable program instructions and manage information used by the intelligent server 290. The big data platform 270 may collect data of the user. The analytic platform 280 may include various processing circuitry and/or executable program instructions and manage a quality of service (QoS) of the intelligent server 290. For example, the analytic platform 280 may manage the components and processing rate (or efficiency) of the intelligent server 290.

The service server 300 may provide a designated service (e.g., food ordering or hotel reservation) to the electronic device 201. The service server 300 may be a server operated by a third party. The service server 300 may provide the intelligent server 290 with information to be used for generating a plan corresponding to a received user input. The provided information may be stored in the capsule DB 230. In addition, the service server 300 may provide resulting information according to the plan to the intelligent server 290.

In the integrated intelligence system 20 described above, the electronic device 201 may provide various intelligent services to a user in response to a user input. The user input may include, for example, an input through a physical button, a touch input, or a voice input.

The electronic device 201 may provide a speech recognition service through an intelligent app (or a speech recognition app) stored therein. In this case, the electronic device 201 may recognize a user utterance or a voice input received through the microphone 206, and provide a service corresponding to the recognized voice input to the user.

The electronic device 201 may perform a designated action alone or together with the intelligent server 290 and/or the service server 300 based on the received voice input. For example, the electronic device 201 may execute an app corresponding to the received voice input and perform the designated action through the executed app.

When the electronic device 201 provides the service together with the intelligent server 290 and/or the service server 300, the electronic device 201 may detect a user utterance using the microphone 206 and generate a signal (or voice data) corresponding to the detected user utterance. The electronic device 201 may transmit the voice data to the intelligent server 290 using the communication interface 202.

The intelligent server 290 may generate, as a response to the voice input received from the electronic device 201, a plan for performing a task corresponding to the voice input or a result of performing an action according to the plan. The plan may include, for example, a plurality of actions for performing the task corresponding to the voice input of the user, and a plurality of concepts related to the actions. The concepts may define parameters input to the execution of the actions or resulting values output by the execution of the actions. The plan may include connection information between the actions and the concepts.

The electronic device 201 may receive the response using the communication interface 202. The electronic device 201 may output a voice signal generated in the electronic device 201 to the outside using the speaker 205, or output an image generated in the electronic device 201 to the outside using the display module 204.

Figure 3:
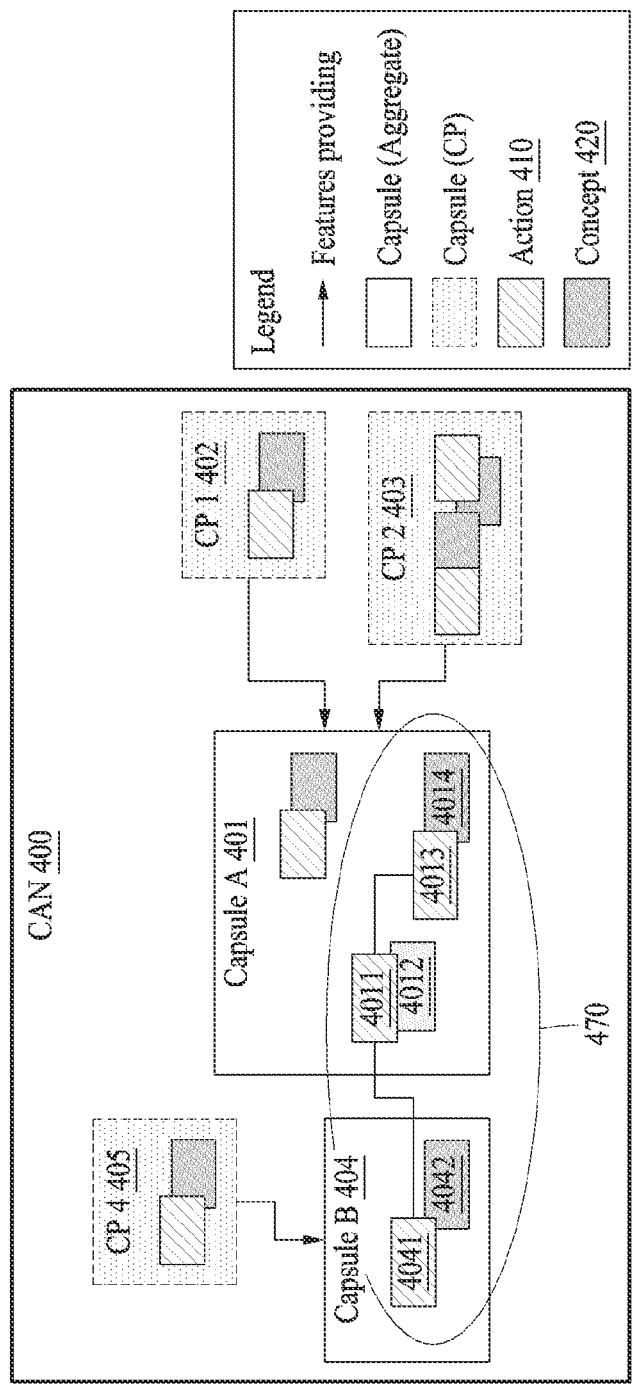
FIG. 3 is a diagram illustrating an example form in which concept and action relationship information is stored in a database (DB) according to various example embodiments.

FIG. 3 is a diagram illustrating an example form in which concept and action relationship information is stored in a DB according to various example embodiments.

A capsule DB (e.g., the capsule DB 230 of FIG. 2) of an intelligent server (e.g., the intelligent server 290 of FIG. 2) may store therein capsules in the form of a concept action network (CAN) 400. The capsule DB may store, in the form of the CAN 400, actions for processing a task corresponding to a voice input of a user and parameters necessary for the actions.

The capsule DB may store a plurality of capsules, for example, a capsule A 401 and a capsule B 404, respectively corresponding to a plurality of domains (e.g., applications). One capsule (e.g., the capsule A 401) may correspond to one domain (e.g., a location (geo) application). In addition, one capsule may correspond to at least one service provider (e.g., CP1 402 or CP2 403) for performing a function for a domain related to the capsule. One capsule may include at least one action 410 and at least one concept 420 for performing a designated function.

A natural language platform (e.g., the natural language platform 220 of FIG. 2) may generate a plan for performing a task corresponding to a received voice input using the capsules stored in the capsule DB. For example, a planner module (e.g., the planner module 225 of FIG. 2) of the natural language platform may generate the plan using the capsules stored in the capsule DB. For example, the planner module may generate a plan 470 using actions 4011 and 4013 and concepts 4012 and 4014 of the capsule A 401 and using an action 4041 and a concept 4042 of the capsule B 404.

Figure 4:
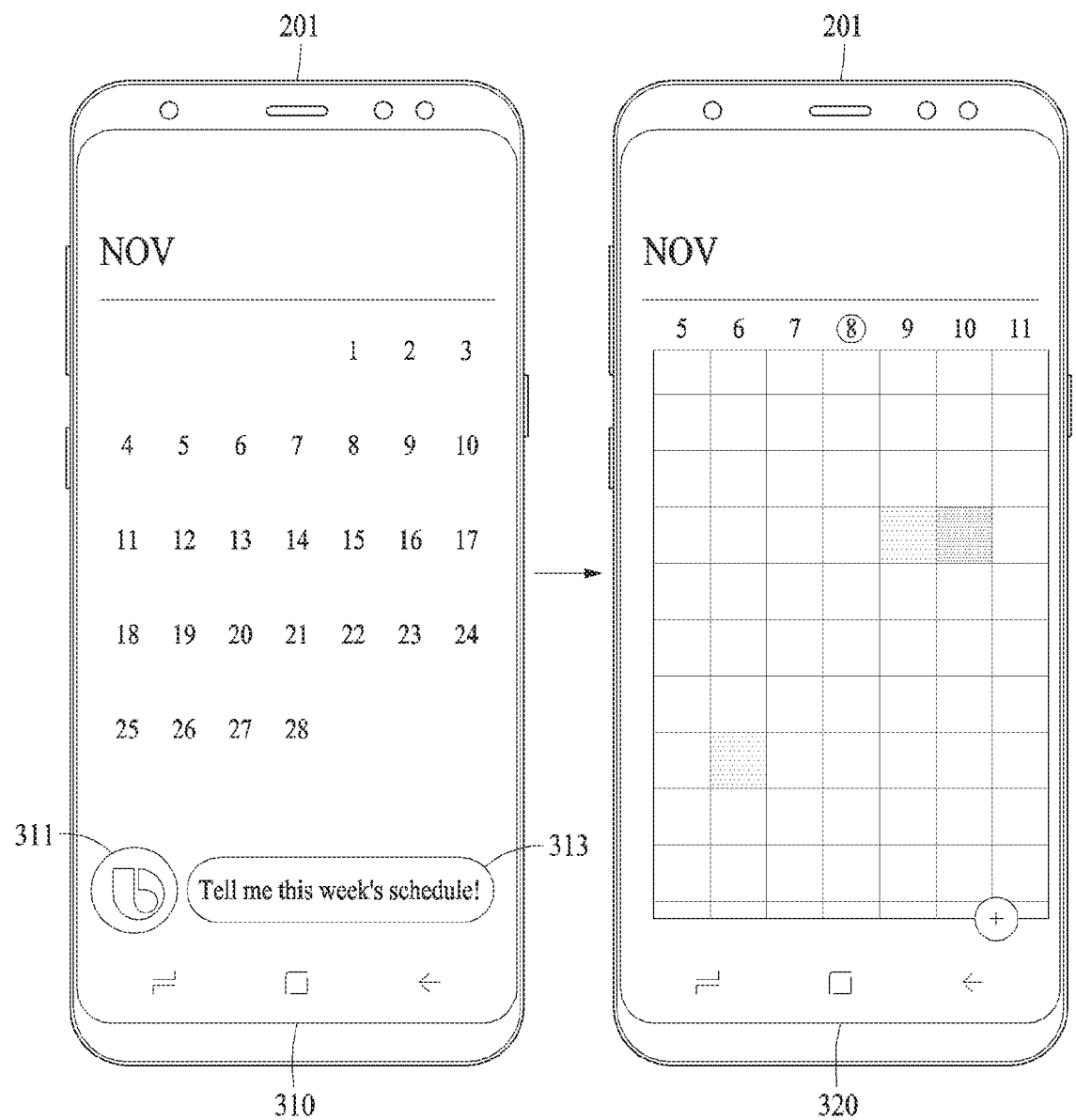
FIG. 4 is a diagram illustrating example screens showing an electronic device processing a received voice input through an intelligent app according to various example embodiments.

FIG. 4 is a diagram illustrating example screens showing an electronic device processing a received voice input through an intelligent app according to various example embodiments.

The electronic device 201 may execute an intelligent app to process a user input through an intelligent server (e.g., the intelligent server 290 of FIG. 2).

Referring to FIG. 4, on a first screen 310, when a designated voice input (e.g., Wake up!) is recognized or an input is received through a hardware key (e.g., a dedicated hardware key), the electronic device 201 may execute an intelligent app for processing the voice input. The electronic device 201 may execute the intelligent app, for example, while a scheduling app is being executed. The electronic device 201 may display an object (e.g., an icon) 311 corresponding to the intelligent app on a display (e.g., the display module 204 of FIG. 2). The electronic device 201 may receive the voice input corresponding to a user utterance. For example, the electronic device 201 may receive a voice input "Tell me this weeks schedule!." The electronic device 201 may display, on the display module 204, a user interface (UI) 313 (e.g., an input window) of the intelligent app in which text data of the received voice input is displayed.

On a second screen 320, the electronic device 201 may display, on the display module 204, a result corresponding to the received voice input. For example, the electronic device 201 may receive a plan corresponding to the received user input and display, on the display module 204, "this weeks schedule" according to the plan.

Figure 5:
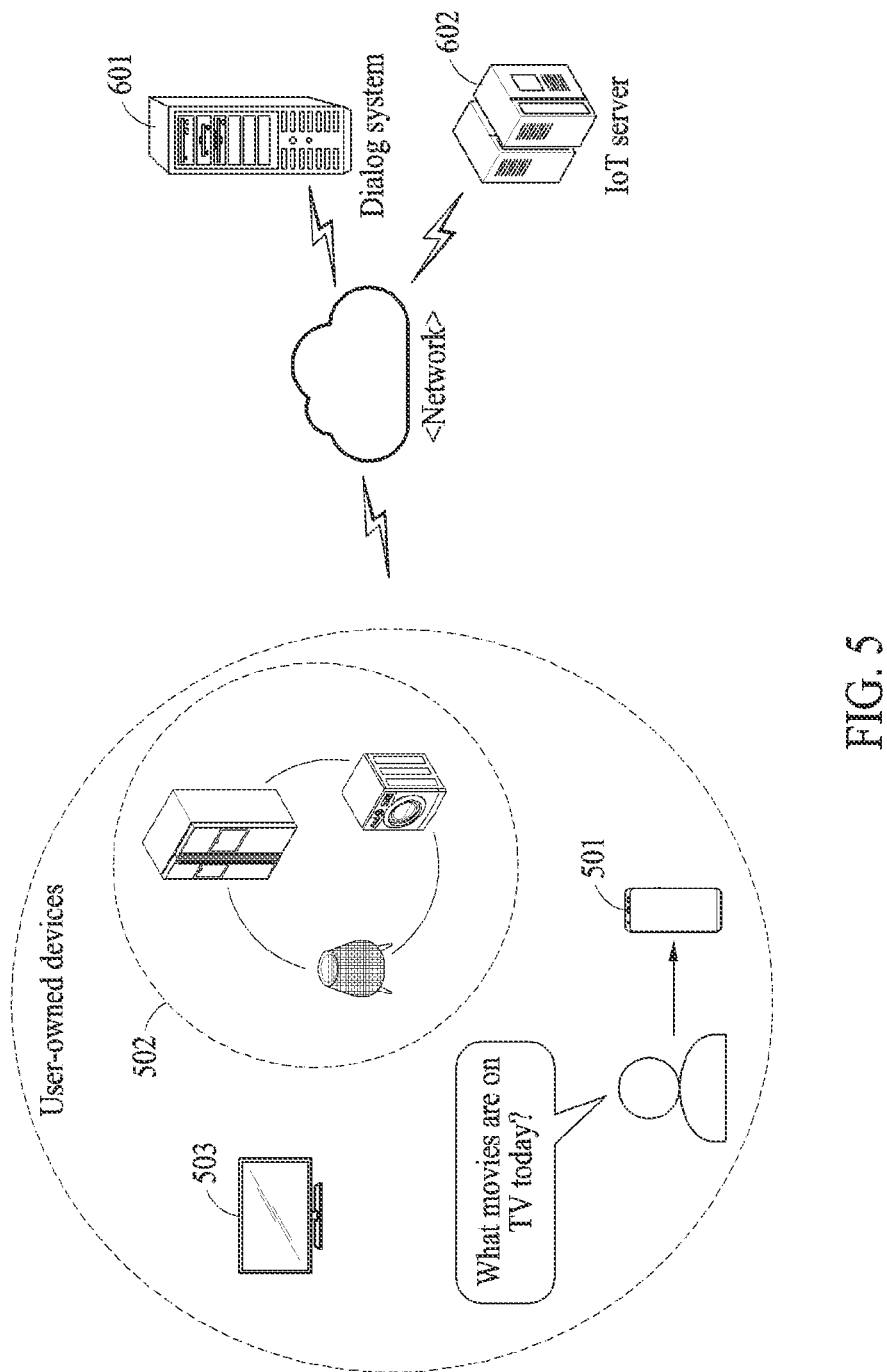
FIG. 5 is a diagram illustrating an example concept of generating and providing an object based on a distance between an electronic device and a target device according to various example embodiments.

FIG. 5 is a diagram illustrating an example concept of generating and providing an object based on a distance between an electronic device and a target device according to various example embodiments.

Referring to FIG. 5, according to various example embodiments, an electronic device 501 (e.g., the electronic device 101 of FIG. 1 or the electronic device 201 of FIG. 2), a target device 503, at least one nearby device 502, an Internet of things (IoT) server 602, and a dialog system 601 (e.g., the intelligent server 290 of FIG. 2) may be connected through a local area network (LAN), a wide area network (WAN), a value-added network (VAN), a mobile radio communication network, a satellite communication network, or a combination thereof. The devices 501, 503, and 502, the IoT server 602, and the dialog system 601 may communicate with one another through a wired communication method or a wireless communication method (e.g., Wi-Fi, Bluetooth, Bluetooth low energy (BLE), ZigBee, Wi-Fi direct (WFD), ultra-wideband (UWB), infrared data association (IrDA), and near-field communication (NFC)). The electronic device 501 may be connected to the target device 503 and the nearby device 502 through a gateway or relay and/or be connected directly to the target device 503 and the nearby device 502. The electronic device 501 may be connected to the target device 503 and the nearby device 502 through a server (e.g., the intelligent server 290 of FIG. 2).

According to various example embodiments, the devices 501, 503, and 502 may be implemented as at least one of, for example, and without limitation, a smartphone, a tablet personal computer (PC), a mobile phone, a speaker (e.g., AI speaker), a video phone, an e-book reader, a desktop PC, a laptop PC, a netbook computer, a workstation, a server, a personal digital assistant (PDA), a portable multimedia player (PMP), an MP3 player, a mobile medical device, a camera, a wearable device, or the like. The devices 501, 503, and 502 may each be implemented as a home appliance. The home appliance may include, for example, and without limitation, a television (TV), a digital video disc (DVD) player, an audio, a refrigerator, an air conditioner, a vacuum cleaner, an oven, a microwave, a washing machine, an air purifier, a set-top box, a home automation control panel, a security control panel, a game console, an electronic key, a camcorder, an electronic frame, or the like.

The devices 501, 503, and 502 may each be a user-owned device. The user-owned device described herein may refer to a device possessed by a user. For example, the electronic device 501 may be a listening device that receives an utterance (e.g., a command) of a user. In a case in which the utterance of the user is a device-controlling utterance (e.g., an utterance for controlling a remote device) that is uttered by the user to control another electronic device besides the electronic device 501, the target device 503 (which is a target for the device-controlling utterance) may be an executing device that executes the command of the user. The nearby device 502 may be a device located around the electronic device 501. Although the electronic device 501, the target device 503, and the nearby device 502 are distinguishably illustrated in FIG. 5 for the convenience of description, any one of the target device 503 and the nearby device 502 may be the listening device, and any one of the electronic device 501 and the nearby device 502 may be the executing device.

When the utterance of the user is the device-controlling utterance for the target device 503, the electronic device 501 may verify a distance (e.g., a short or long distance. As used herein, the terms "short distance" and "long distance" refer to distances that may be less than or equal to a specified or threshold distance or greater than the threshold or specified distance) between the electronic device 501 and the target device 503. To determine the distance between the electronic device 501 and the target device 503, the electronic device 501 may interwork with the IoT server 602 to perform at least one of an operation of obtaining a user-owned device list corresponding to a type of the target device 503, and an operation of detecting one or more nearby devices (e.g., the nearby device 502 and the target device 503) located around the electronic device 501 and obtaining device location information from the nearby devices.

The electronic device 501 may output (e.g., display and voice-output) an object (e.g., a UI) that is generated differently based on whether the distance between the electronic device 501 and the target device 503 is a short distance or a long distance. The short distance and the long distance described herein may be physically distinguished from each other or be spatially distinguished (or separated) from each other and may be defined with respect to a specified threshold distance.

The IoT server 602 may obtain, store, and manage device information (e.g., a device identity (ID), a device type, function performing ability information, device location information (e.g., registered location information), or state information) of a user-owned device (e.g., the electronic device 501, the target device 503, and the nearby device 502). The electronic device 501, the target device 503, and the nearby device 502 may be devices registered in advance in the IoT server 602 in association with account information (e.g., a user ID) of the user.

The function performing ability information in the device information may be information associated with functions of a device defined in advance for the device to perform operations. For example, when the device is an air conditioner, the function performing ability information may be information associated with, for example, a temperature raising (up) function, a temperature reducing (down) function, or an air purifying function. For example, when the device is a speaker, the function performing ability information may be information associated with, for example, a volume raising (up) function, a volume lowering (down) function, or a song playing function. The location information (e.g., the registered location information) in the device information may be information indicating a location (e.g., a registered location) of a device, and include a name of the location of the device and location coordinate values indicating the location of the device. For example, the location information of the device may include a name indicating a location inside a house, for example, a room or a living room, or a name of a location such as a house or an office. For example, the location information of the device may include geofence information.

The state information in the device information may be information indicating a current state of a device and include, for example, at least one of power on or off information and information on a currently executing operation.

The IoT server 602 may receive the type of the target device 503 from the electronic device 501, generate the user-owned device list corresponding to the type of the target device 503 using the stored device information, and transmit the user-owned device list to the electronic device

501. The user-owned device list may include a device ID of each of one or more devices included in the user-owned device list.

The IoT server 602 may obtain, determine, or generate a control command for controlling a device using the stored device information. The IoT server 602 may transmit the control command to a device that is determined to perform an operation based on operation information. The IoT server 602 may receive, from the device performing the operation, a result of performing the operation based on the control command. The IoT server 602 may be implemented as a hardware device independent of an intelligent server (e.g., the intelligent server 290 of FIG. 2), but is not limited thereto. For example, the IoT server 602 may be a component of the intelligent server, or a server designed to be distinguished by software.

The electronic device 501 may obtain a voice signal (or an audio signal, hereinafter) from an utterance of the user and transmit the voice signal to the dialog system 601. The voice signal may correspond to a computer-readable text that is converted from a voice part of the utterance through ASR performed on the utterance of the user. The dialog system 601 may analyze the utterance of the user using the voice signal, and generate at least one of a response relating to analyzed details (e.g., an intent, an entity, and a capsule) or an object associated with an intention of the user, and transmit the generated one to a device (e.g., the electronic device 501 and/or the target device 503). The dialog system 601 may be implemented as software. The dialog system 601 may be partially and/or entirely implemented in the electronic device 501 and/or an intelligent server (e.g., the intelligent server 290 of FIG. 2).

The dialog system 601 may differently generate an object to be output to at least one of the electronic device 501 and the target device 503 based on whether the distance between the electronic device 501 and the target device 503 is a short distance or a long distance (e.g., whether the distance is less than or equal to or greater than a specified threshold distance). For example, when the distance between the electronic device 501 and the target device 503 is a short distance (e.g., less than or equal to a specified threshold distance), the dialog system 601 may generate an object to be output respectively to the electronic device 501 and the target device 503 according to the short distance, and transmit the generated object to the electronic device 501 and the target device 503. When the distance between the electronic device 501 and the target device 503 is a long distance (e.g., greater than a specified threshold distance), the dialog system 601 may generate an object to be output to the electronic device 501 according to the long distance and output the generated object to the electronic device 501.

The object to be output to the electronic device 501 may be generated differently based on whether the distance is a short distance or a long distance. The object to be generated according to the long distance and provided to the electronic device 501 may be an object to be generated according to the short distance and provided to the target device 503. For example, there may be a case in which the electronic device 501 is a smartphone and the target device 503 is a TV, and a user controls the TV using the smartphone. In this case, in a short distance in which the user may give a command through the smartphone while watching the TV, an object corresponding to the short distance may be provided to both the smartphone and the TV and the user may thus use the object displayed on the smartphone while watching the object displayed on a screen of the TV. In this case, in a long distance in which the user is not able to watch the TV because the user is remote from the TV, an object to be displayed on the screen of the TV may not be provided to the TV but to the smartphone of the user located remotely and the user may thus use the object.

As the object may be provided to the user according to the distance between the electronic device 501 and the target device 503, user convenience and user experience may be improved.

Figure 6:
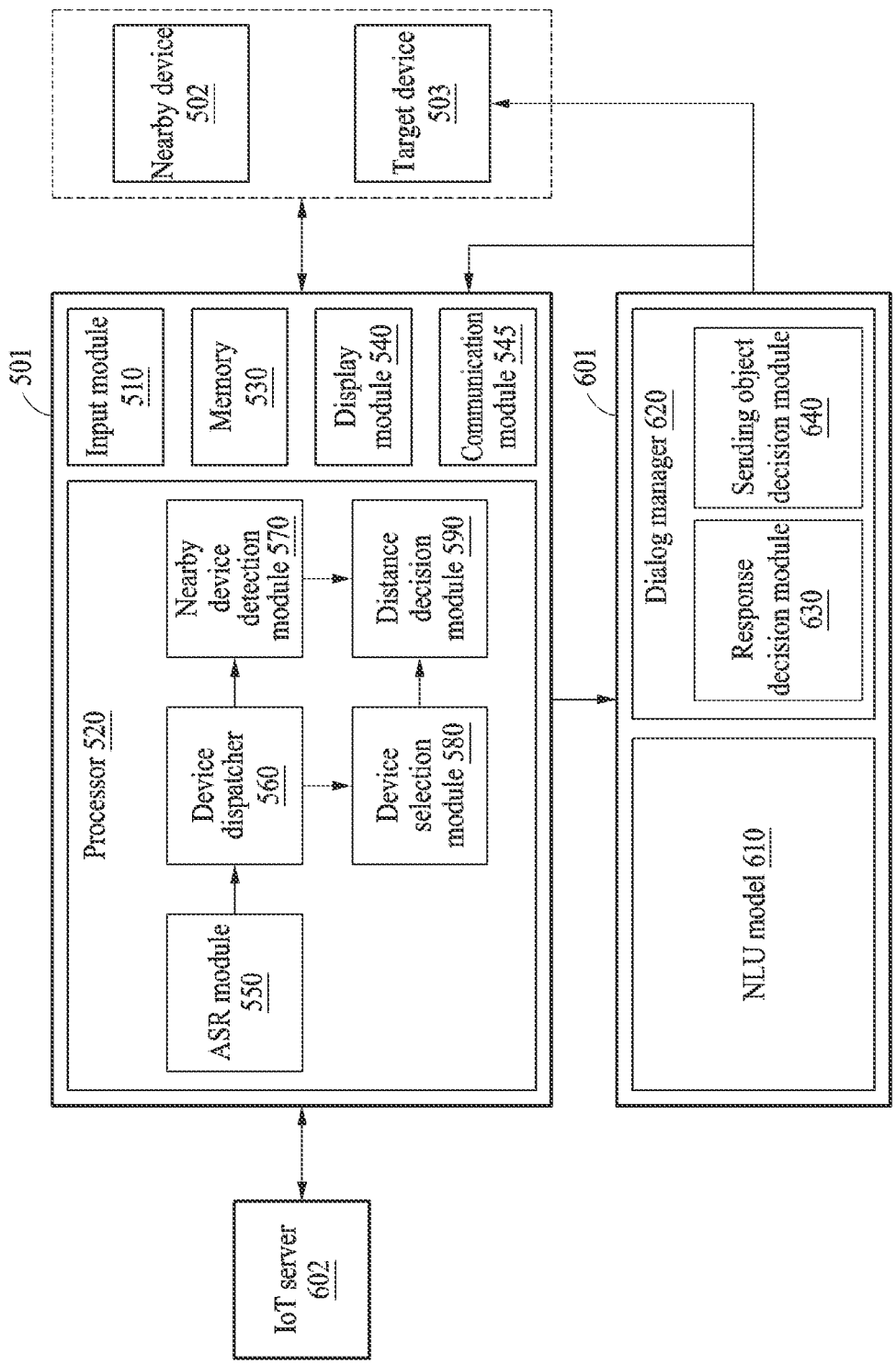
FIG. 6 is a diagram illustrating an example electronic device and an example dialog system for generating and providing an object based on a distance between the electronic device and a target device according to various example embodiments.

FIG. 6 is a diagram illustrating an example electronic device and an example dialog system for generating and providing an object based on a distance between the electronic device and a target device according to various example embodiments. Referring to FIG. 6, according to various example embodiments, the electronic device 501 may include an input module (e.g., including input circuitry) 510 (e.g., the input module 150 of FIG. 1 and the microphone 206 of FIG. 2), at least one processor (e.g., including processing circuitry) 520 (e.g., the processor 120 of FIG. 1 and the processor 203 of FIG. 2), a memory 530 (e.g., the memory 130 of FIG. 1 and the memory 207 of FIG. 2) electrically connected to the processor 520, a display module (e.g., including a display) 540 (e.g., the display module 160 of FIG. 1 and the display module 204 of FIG. 2), and a communication module (e.g., including communication circuitry) 545 (e.g., the communication module 190 of FIG. 1 and the communication interface 202 of FIG. 2). An ASR module 550, a device dispatcher 560, a nearby device detection module 570, a device selection module 580, and a distance decision module 590 may be executable by the processor 520 and be configured as at least one of a program code including instructions storable in the memory 530, an application, an algorithm, a routine, a set of instructions, and an artificial intelligence (AI) learning model. In addition, at least one of the ASR module 550, the device dispatcher 560, the nearby device detection module 570, the device selection module 580, and the distance decision module 590 may be implemented by hardware or a combination of hardware and software.

The electronic device 501 may receive an utterance of a user through the input module 510. The ASR module 550 may convert a voice part of the utterance of the user into a computer-readable text by performing ASR on the utterance of the user. For example, the ASR module 550 may perform the ASR on the utterance of the user using an acoustic model (AM) or a language model (LM). The ASR module 550 may output the text to the device dispatcher 560.

The device dispatcher 560 may determine whether the utterance of the user is a device-controlling utterance for the target device 503 from the text. The device dispatcher 560 may determine whether the utterance of the user is the device-controlling utterance for the target device 503 based on a predetermined pattern (e.g., device-related words or phrases) extracted from the text. For example, when the text obtained through the conversion from the utterance of the user is "What movies are on TV?," the device dispatcher 560 may determine the utterance to be the device-controlling utterance from a pattern corresponding to "on TV."

The device dispatcher 560 may also determine whether the utterance of the user is the device-controlling utterance for the target device 503 based on an intent inferred from the text. The intent may be information indicating an intention of the user that is determined through interpretation of the text. The intent, which is information indicating the intention in the utterance of the user, may be information indicating an operation of a device (e.g., the nearby device 502 and/or the target device 503) requested by the user. For example, when the text obtained through the conversion from the utterance of the user is "Play the latest movie on TV," the device dispatcher 560 may determine the utterance of the user to be the device-controlling utterance because the intent from the text is 'play the contents.' For example, when the text obtained through the conversion from the utterance of the user is "Turn down the volume on TV," the device dispatcher 560 may determine the utterance of the user to be the device-controlling utterance because the intent from the text is 'control the volume.'

The device dispatcher 560 may determine a type (e.g., a device type) of the target device 503. The device dispatcher 560 may determine the type of the target device 503 using the intent inferred from the text. A type (or a device type) described herein may indicate a category of a device into which the device is classified based on a set standard. The device type may be determined based on a function of a device or a purpose of use of the device. For example, the device may be classified into a type of an audio device (e.g., a speaker) configured to output an audio signal, a type of an image device (e.g., a TV) configured to output both an audio signal and an image signal, a type of an air-conditioning device (e.g., an air-conditioner) configured to control an air temperature, and/or a type of a cleaning device (e.g., a robotic vacuum cleaner), but examples of which are not limited thereto.

When the utterance of the user is the device-controlling utterance, the device selection module 580 may obtain a user-owned device list corresponding to the type of the target device 503 by communicating with the IoT server 602. When receiving the type of the target device 503 from the device dispatcher 560, the IoT server 602 may generate the user-owned device list including one or more devices possessed by the user corresponding to the type of the target device 503 and transmit the generated user-owned device list to the device selection module 580.

The device selection module 580 may select a predetermined (or specified) device as the target device 503 from the user-owned device list including the devices possessed by the user, and output an ID of the selected device to the distance decision module 590. In this case, when a plurality of devices is included in the user-owned device list, the device selection module 580 may prompt the user-owned device list to the user. The user may then select the device as the target device 503 from the user-owned device list, and the ID of the device selected by the user may be output as an ID of the target device 503.

When the utterance of the user is the device-controlling utterance, the nearby device detection module 570 may detect nearby devices (e.g., the nearby device 502 and the target device 503) located nearby and obtain (e.g., measure) device location information from the devices 502 and 503. The nearby device detection module 570 may broadcast a location information request for detecting the devices 502 and 503 located around the electronic device 501. The devices 502 and 503 located nearby may transmit (e.g., advertise) device location information in response to the location information request. The nearby device detection module 570 may receive the device location information that is transmitted from the devices 502 and 503 located nearby in response to the location information request. The device location information may include, for example, at least one of a UWB signal (e.g., UWB signal strength), a BLE signal (e.g., BLE signal strength), Wi-Fi connection information, and registered location information.

The nearby device detection module 570 may detect the devices 502 and 503 located nearby for a preset period of time (e.g., N seconds). The nearby device detection module 570 may output a detected device list including the detected (e.g., received) devices and the device location information to the distance decision module 590.

The distance decision module 590 may determine a distance between the electronic device 501 and the target device 503 using the ID of the target device 503, the detected device list, and/or the device location information. The distance decision module 590 may determine the distance between the electronic device 501 and the target device 503 by comprehensively considering a UWB signal (e.g., UWB signal strength), a BLE signal (e.g., BLE signal strength), Wi-Fi connection information, and/or registered location information that are included in the device location information.

The distance decision module 590 may determine whether a distance between the electronic device 501 and the devices 502 and 503 located nearby is a short distance (e.g., less than or equal to a specified threshold distance) or a long distance (e.g., greater than a specified threshold distance) using the device location information. The distance decision module 590 may determine whether the distance between the electronic device 501 and the target device 503 is a short distance or a long distance by comparing the ID of the target device 503 and the detected device list. The distance decision module 590 may determine whether the distance between the electronic device 501 and the target device 503 is a short distance or a long distance using the device location information while comparing the ID of the target device 503 and the detected device list. For example, the distance decision module 590 may calculate a signal strength value (e.g., a UWB/BLE received signal strength indicator (RSSI) of a signal transmitted from the target device 503. In this example, when the signal strength value is greater than or equal to a threshold value, the distance decision module 590 may determine the distance between the electronic device 501 and the target device 503 to be a short distance. For another example, when, although the signal (e.g., UWB/BLE) is not included in the device location information, the electronic device 501 is determined to be connected to the nearby device 502 through the same Wi-Fi and the target device 503 and the nearby device 502 are determined to be registered with the same location information (e.g., the same geofence information) based on another information, the distance decision module 590 may determine the distance between the electronic device 501 and the target device 503 to be a short distance.

The distance decision module 590 may transmit, to the dialog system 601, the distance between the electronic device 501 and the target device 503 that is determined to be a short distance or a long distance, and the ID of the target device 503.

The display module 540 may receive an object (e.g., a UI) generated differently based on whether the distance between the electronic device 501 and the target device 503 is a short distance or a long distance, and output (e.g., display) the object.

The dialog system 601 may include an NLU model 610 and a dialog manager 620. The NLU model 610 and the dialog manager 620 may be implemented by at least one of a program code including storable instructions, an application, an algorithm, a routine, a set of instructions, or an AI learning model. The NLU model 610 and/or the dialog manager 620 may be implemented, partially or entirely, in the electronic device 501 and/or an intelligent server (e.g., the intelligent server 290 of FIG. 2).

The NLU model 610 (e.g., the NLU module 223 of FIG. 2) may determine an intent, an entity, and/or a capsule that are associated with the utterance of the user by analyzing the text obtained through the conversion from the utterance of the user. The text obtained through the conversion from the utterance of the user may be received from the device dispatcher 560.

The dialog manager 620 may include a response decision module 630 and a sensing object decision module 640. The response decision module 630 may determine (e.g., generate) a response (e.g., an answer) to be sent to the user using the intent, the entity, and/or the capsule analyzed in the NLU model 610. The sending object decision module 640 may verify the device type of the electronic device 501 and the target device 503, and differently generate an object to be output to the electronic device 501 and the target 503 based on whether the distance between the electronic device 501 and the target device 503 is a short distance. When the distance between the electronic device 501 and the target device 503 is a short distance, the sending object decision module 640 may generate an object to be output to each of the electronic device 501 and the target device 503 according to the short distance, and transmit the generated object to the electronic device 501 and the target device 503. When the distance between the electronic device 501 and the target device 503 is a long distance, the sending object decision module 640 may generate an object to be output to the electronic device 501 according to the long distance and output the generated object to the electronic device 501. The object to be output to the electronic device 501 may be generated differently based on a short distance or a long distance.

Figure 7A:
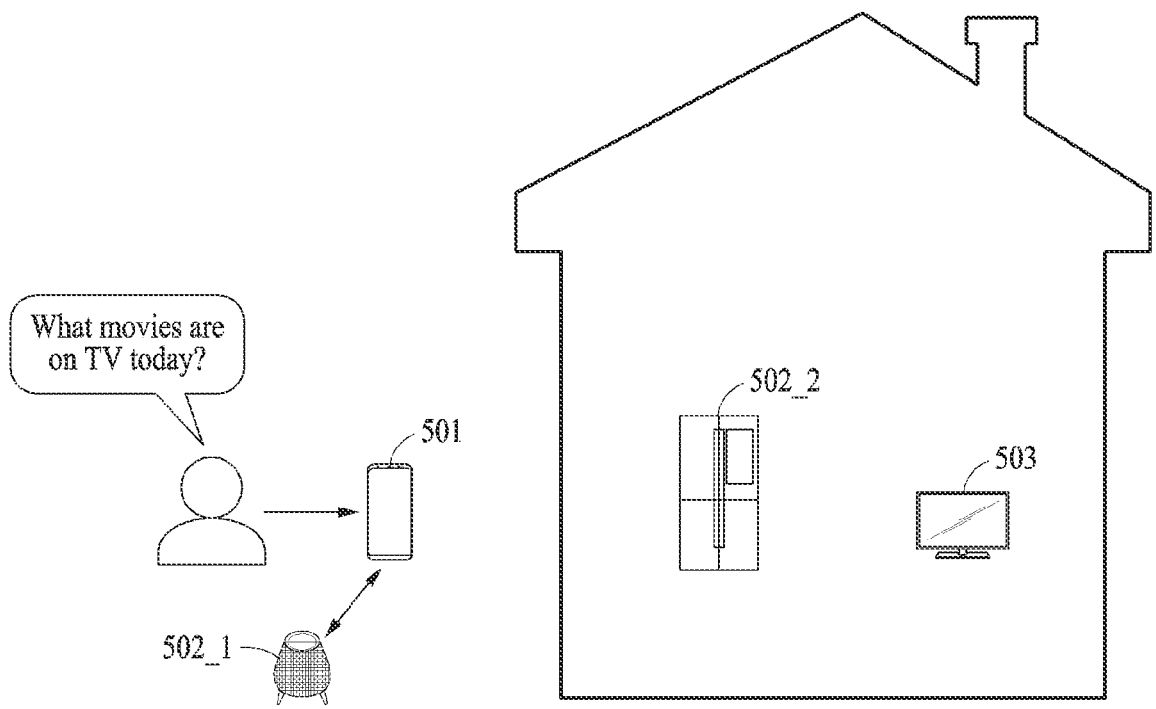
FIGS. 7A and 7B are diagrams illustrating examples of determining a distance between an electronic device and a target device to be a short distance or a long distance according to various example embodiments.

FIG. 7A is a diagram illustrating an example of determining a distance between an electronic device and a target device to be a short distance or a long distance according to various example embodiments.

In the example of FIG. 7A, it is assumed for the convenience of description that a user is outside a house along with the electronic device 501 and a nearby device 502_1, and the target device 503 and a nearby device 502_2 are inside the house. In this example, when an utterance of the user is a device-controlling utterance for the target device 503, the electronic device 501 may obtain an ID of the target device 503 from the IoT server 602 and broadcast a location information request for detecting nearby devices.

In this example, the electronic device 501 may obtain device location information from the nearby device 502_1, but not obtain device location information from the nearby device 502_2 and the target device 503 located inside the house. The electronic device 501 may then determine that only the nearby device 502_1 is located at a short distance and the nearby device 502_2 and the target device 503 are located at a long distance based on a location of the electronic device 501, using the ID of the target device 503, a detected device list (including detected device, for example, only the nearby device 502_1), and device location information (e.g., device location information of the nearby device 502_1).

Figure 7B:
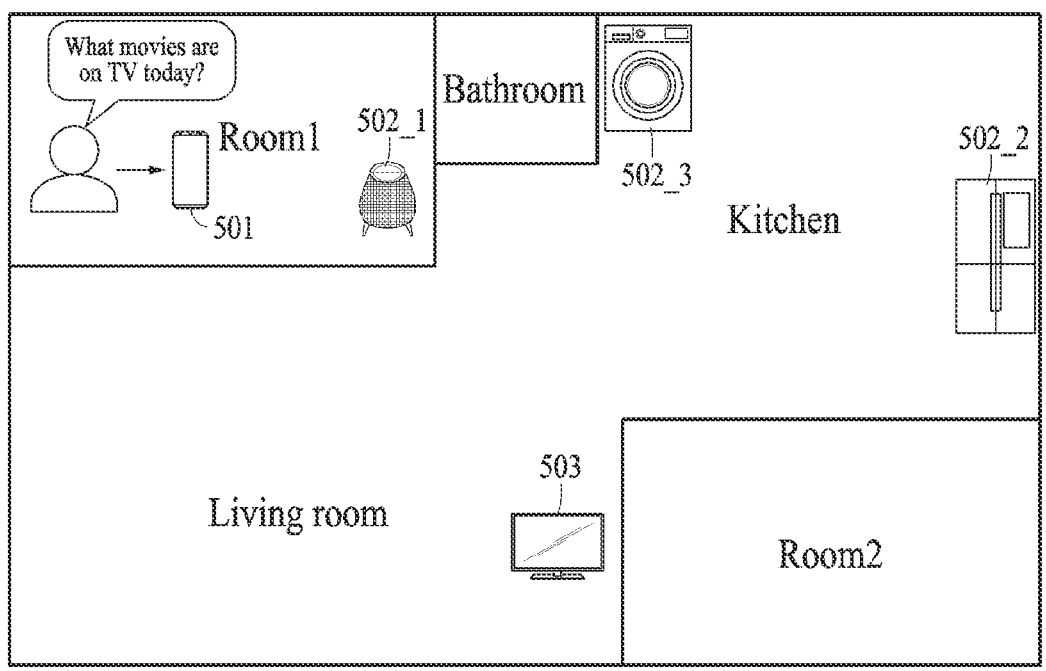

FIG. 7B is a diagram illustrating another example of determining a distance between an electronic device and a target device to be a short distance or a long distance according to various example embodiments.

In the example of FIG. 7B, it is assumed for the convenience of description that the electronic device 501, the target device 503, and nearby devices 502_1, 502_2, and 502_3 are all located inside a house, but the electronic device 501 and the target device 503 are spatially separated from each other in the house. In this example, when an utterance of a user is a device-controlling utterance for the target device 503, the electronic device 501 may obtain an ID of the target device 503 from the IoT server 602 and broadcast a location information request for detecting nearby devices.

The electronic device 501 may obtain device location information from the target device 503 and the nearby devices 502_1, 502_2, and 502_3. The electronic device 501 may then determine that the target device 503 is located at a long distance based on a location of the electronic device 501, comprehensively using the obtained device location information. For example, when a signal strength value (e.g., a UWB/BLE RSSI) of a signal transmitted from the target device 503 is less than or equal to a threshold value, the electronic device 501 may determine a distance between the electronic device 501 and the target device 503 to be a long distance. In this case, when, although the signal strength value of the signal transmitted from the target device 503 is greater than or equal to the threshold value, a signal strength value of a signal transmitted from the nearby device 502_1 is the greatest and 'room 1' is registered as location information of the nearby device 502_1, the electronic device 501 may determine the distance between the electronic device 501 and the target device 503 to be a long distance by determining that the electronic device 501 is located in room 1 where the nearby device 502_1 is located.

Figure 8A:
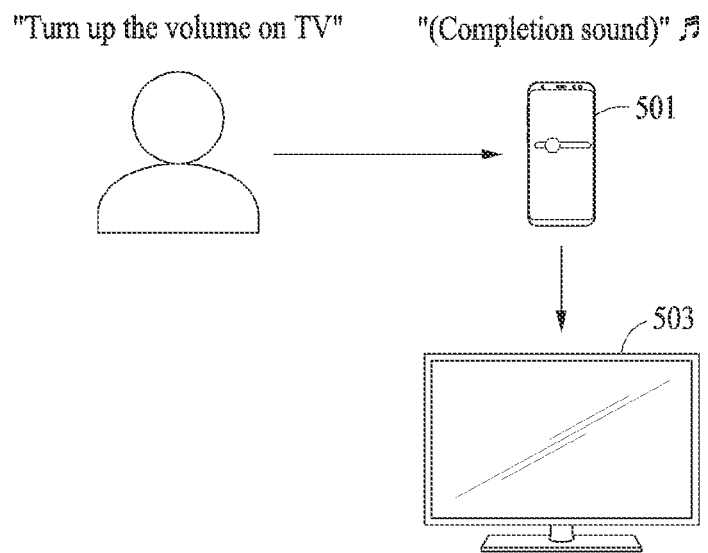
FIGS. 8A, 8B and 8C are diagrams illustrating examples of providing an object based on a distance between an electronic device and a target device according to various example embodiments.

FIG. 8A is a diagram illustrating an example of providing an object based on a distance between an electronic device and a target device according to various example embodiments.

Referring to FIG. 8A, the electronic device 501 may determine an utterance of a user (e.g., "Turn up the volume on TV") to be a device-controlling utterance for the target device 503. Even when the electronic device 501 determines a distance between the electronic device 501 and the target device 503 to be a short distance or a long distance, a dialog system (e.g., the dialog system 601 of FIG. 5) may determine that the utterance (e.g., "Turn up the volume on TV") is for simple function execution which is for executing a simple function of the target device 503 without a need for a UI. That is, for example, the dialog system 601 may determine that the utterance is for simple device controlling without a need for a UI. Regardless of whether the distance between the electronic device 501 and the target device 503 is a short distance or a long distance, an object for the simple function execution may be provided to the electronic device 501.

Figure 8B:
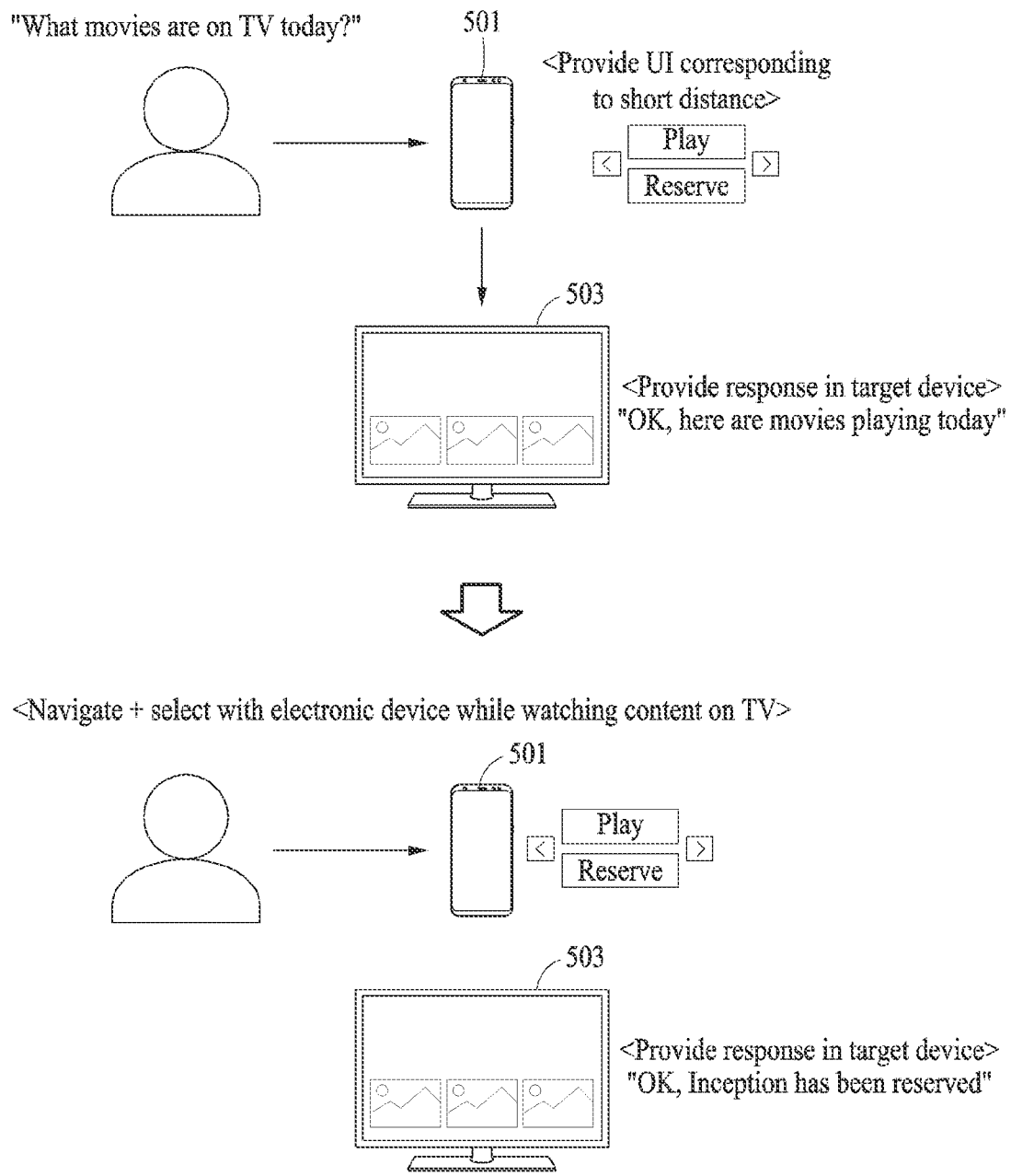

FIG. 8B is a diagram illustrating an example of providing an object based on a distance between an electronic device and a target device according to various example embodiments. In the example of FIG. 8B, it is assumed for the convenience of description that both the electronic device 501 and the target device 503 are present in a living room.

Referring to FIG. 8B, the electronic device 501 may determine an utterance of a user (e.g., "What movies are on TV today?") to be a device-controlling utterance for the target device 503. The electronic device 501 may obtain device location information from a nearby device located around the electronic device 501 including the target device 503, and determine a distance between the electronic device 501 and the target device 503 to be a short distance using the device location information. A dialog system (e.g., the dialog system 601 of FIG. 5) may determine that the utterance (e.g., "What movies are on TV today?") is the device-controlling utterance for the target device 503 and controlling the target device 503 using a UI is required. For example, the dialog system 601 may determine that the utterance is an intensified device-controlling utterance requiring a UI). An object and/or response to be provided to the electronic device 501 and the target device 503 may be generated according to the short distance, based on a result (e.g., an intent, an entity, and a capsule) of analyzing the utterance of the user (e.g., "What movies are on TV today?").

To the target device 530, the response (e.g., an audio output corresponding to "Here are movies playing today") may be provided along with a movie content list (e.g., images of movie contents) corresponding to the utterance of the user (e.g., "What movies are on TV today?"). In addition, to the electronic device 501, a UI for adjusting and selecting a content from the movie content list provided in the target device 503 may be provided. The user may then select (e.g., reserve) a desired content (e.g., Inception) from the movie content list provided to the target device 503, through the UI provided to the electronic device 501.

Figure 8C:
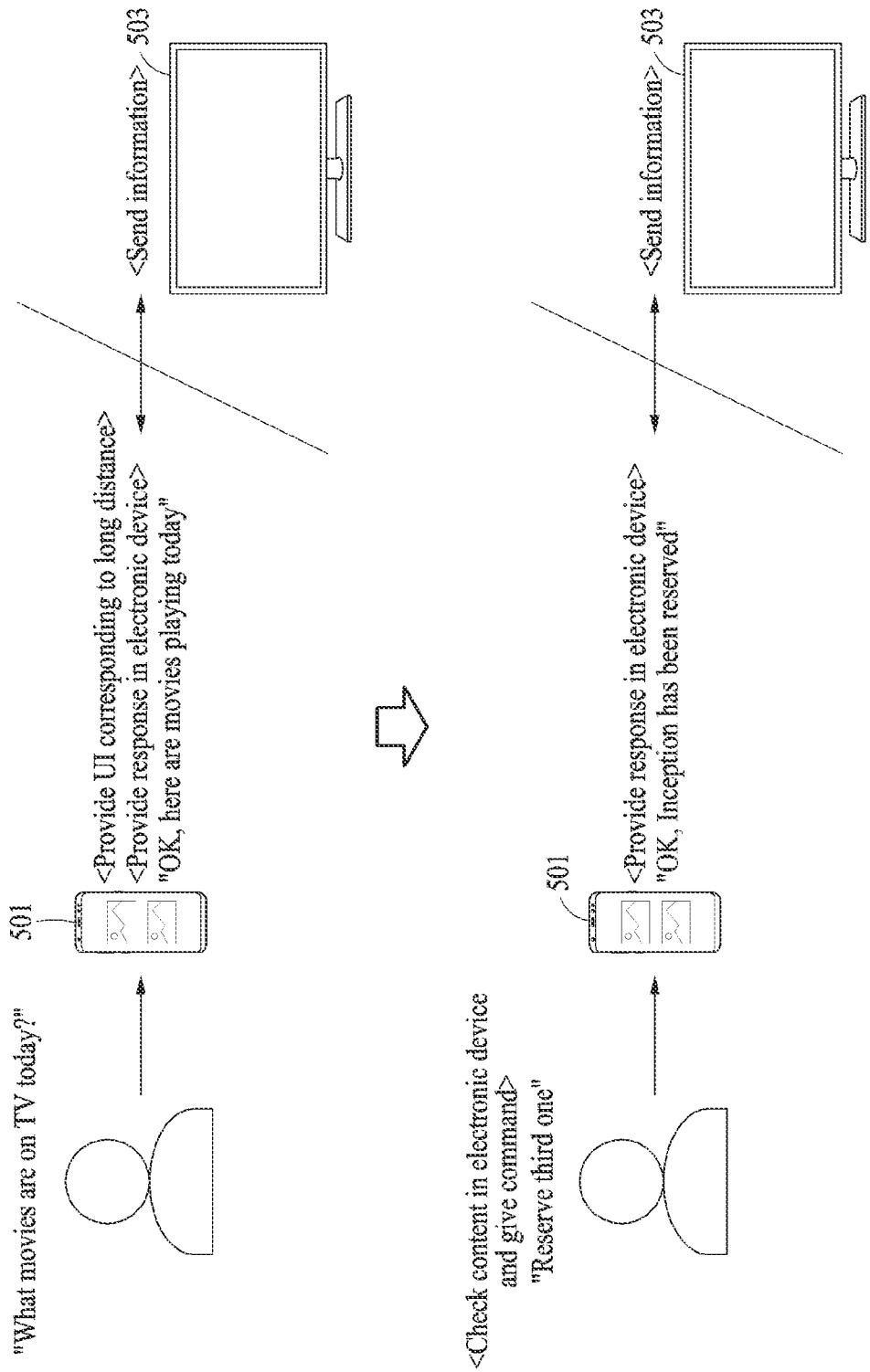

FIG. 8C is a diagram illustrating an example of providing an object based on a distance between an electronic device and a target device according to various example embodiments. In the example of FIG. 8C, it is assumed for the convenience of description that a user and the electronic device 501 are outside a house, and the target device 503 is in a living room in the house.

Referring to FIG. 8C, the electronic device 501 may determine an utterance of the user (e.g., "What movies are on TV today?") to be a device-controlling utterance for the target device 503. The electronic device 501 may obtain device location information from a nearby device located around the electronic device 501. Since the target device 503 is located inside the house, the electronic device 501 may not obtain the device location information from the target device 503. The electronic device 501 may than determine a distance between the electronic device 501 and the target device 503 to be a long distance. A dialog system (e.g., the dialog system 601 of FIG. 5) may determine the utterance of the user (e.g., "What movies are on TV today?") to be the device-controlling utterance for the target device 503 requiring controlling of the target device 503 using a UI. That is, for example, the dialog system 601 may determine the utterance to be an intensified device-controlling utterance requiring a UI. The dialog system 601 may generate only an object and/or response to be provided to the electronic device 501 in consideration of the long distance between the electronic device 501 and the target device 503. The object and/or response to be provided to the electronic device 501 may be generated according to the long distance based on a result (e.g., an intent, an entity, and a capsule) of analyzing the utterance (e.g., "What movies are on TV today?").

To the electronic device 501, a response (e.g., an audio output corresponding to "Here are movies playing today") may be provided along with a movie content list (e.g., images of movie contents) provided to the target device 503 as illustrated in FIG. 8B. Since the user is outside the house and is not able to watch the target device 503, there may be no need to generate an object by the dialog system 601 and provide the object to the target device 503. The user may then select (or reserve) a content (e.g., Inception) from the movie content list provided in the electronic device 501, and the selection of the content may be performed by a command (e.g., a voice command corresponding to "Reserve third one") input to the electronic device 501.

Figure 9:
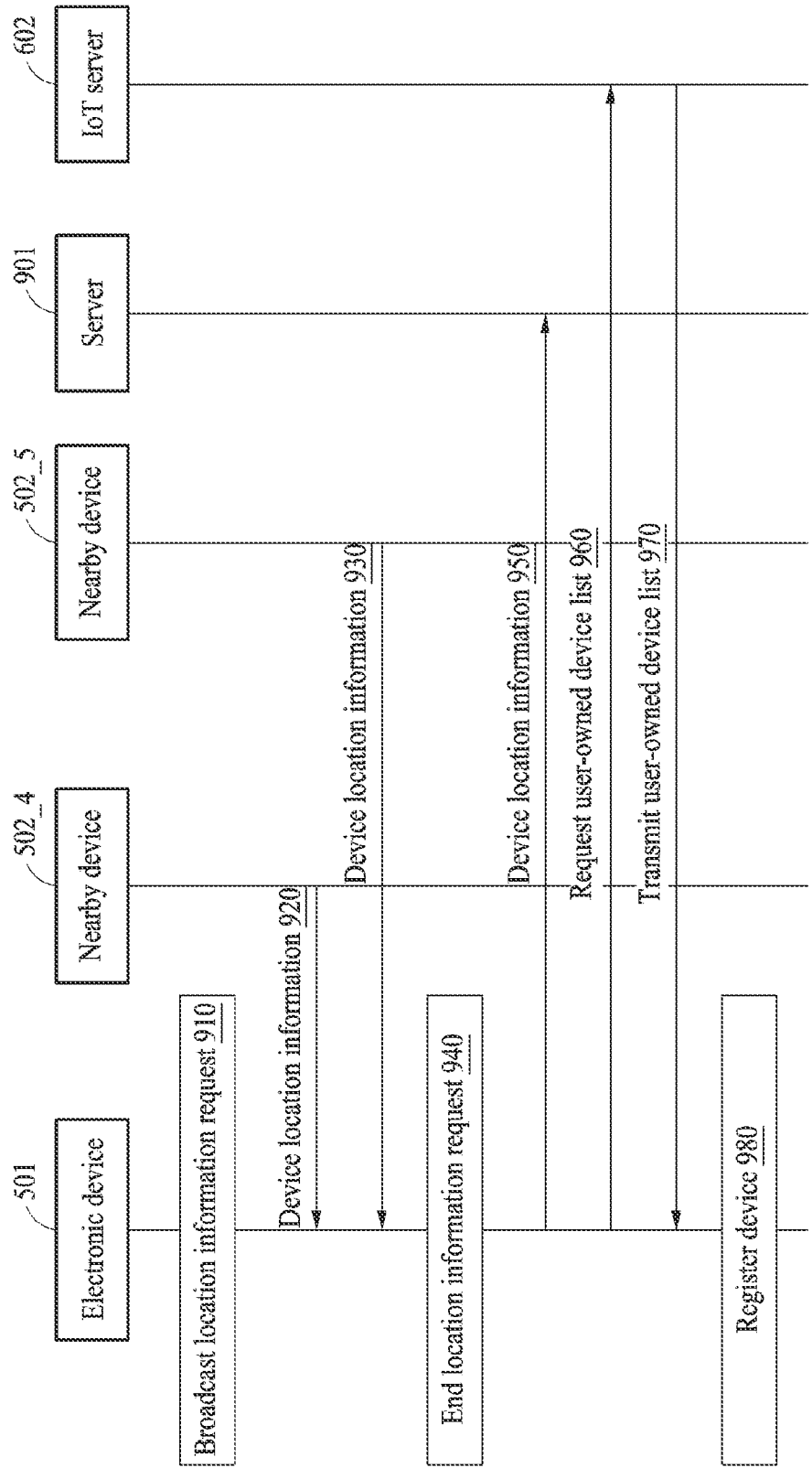
FIG. 9 is a signal flow diagram illustrating an example of detecting a nearby device located around an electronic device according to various example embodiments.

FIG. 9 is a signal flow diagram illustrating an example of detecting a nearby device located around an electronic device according to various example embodiments. Referring to FIG. 9, the electronic device 501 may detect one or more nearby devices 502_4 and 502_5 located around the electronic device 501 and obtain device location information from the nearby devices 502_4 and 502_5.

In operation 910, when an utterance of a user is a device-controlling utterance, the electronic device 501 may broadcast a location information request for detecting the nearby devices 502_4 and 502_5 located around the electronic device 501. For example, the electronic device 501 may detect the nearby devices 502_4 and 502_5 by performing BLE scanning with an interval x and a window y.

In operations 920 and 930, the nearby device 502_4 may transmit (e.g., advertise at an interval of z) device location information in response to the location information request, and the nearby device 502_5 may transmit (e.g., advertise at an interval of z) device location information in response to the location information request.

In operation 940, the electronic device 501 may detect nearby devices for a preset period of time, and end the detecting when the preset time expires.

In operation 950, the electronic device 501 may transmit the device location information obtained from the nearby devices 502_4 and 502_5 to a server 901 (e.g., the intelligent server 290 of FIG. 2). The electronic device 501 may transmit, to the server 901, a detected device list along with the device location information.

In operations 960 and 970, the electronic device 501 may request the IoT server 602 for a user-owned device list including all devices possessed by the user, and receive the user-owned device list transmitted from the IoT server 602.

In operation 980, when any one of the nearby devices 502_4 and 502_5 is not registered as a user-owned device of the user in the IoT server 602 although it is a device (e.g., SmartThings) supported by IoT after the electronic device 501 verifies the user-owned device list, the electronic device 501 may support registration of the device. For example, when one of nearby devices is not registered in user onboarding (e.g., a voice assistant or the intelligent server 290) although it is a device (e.g., Bixby) supported by the voice assistant after the electronic device 501 verifies the user-owned device list, the electronic device 501 may support registration of the device.

According to various example embodiments, the device location information and the detected device list obtained through operations 910 through 950 performed in the electronic device 501 may be used to determine a distance between the electronic device 501 and the target device 503.

Operations 910 through 980 described above with reference to FIG. 9 may be performed in sequential order but not be necessarily performed in sequential order. For example, the order of operations 910 through 980 may be changed and at least two of operations 910 through 980 may be performed in parallel.

Figure 10:
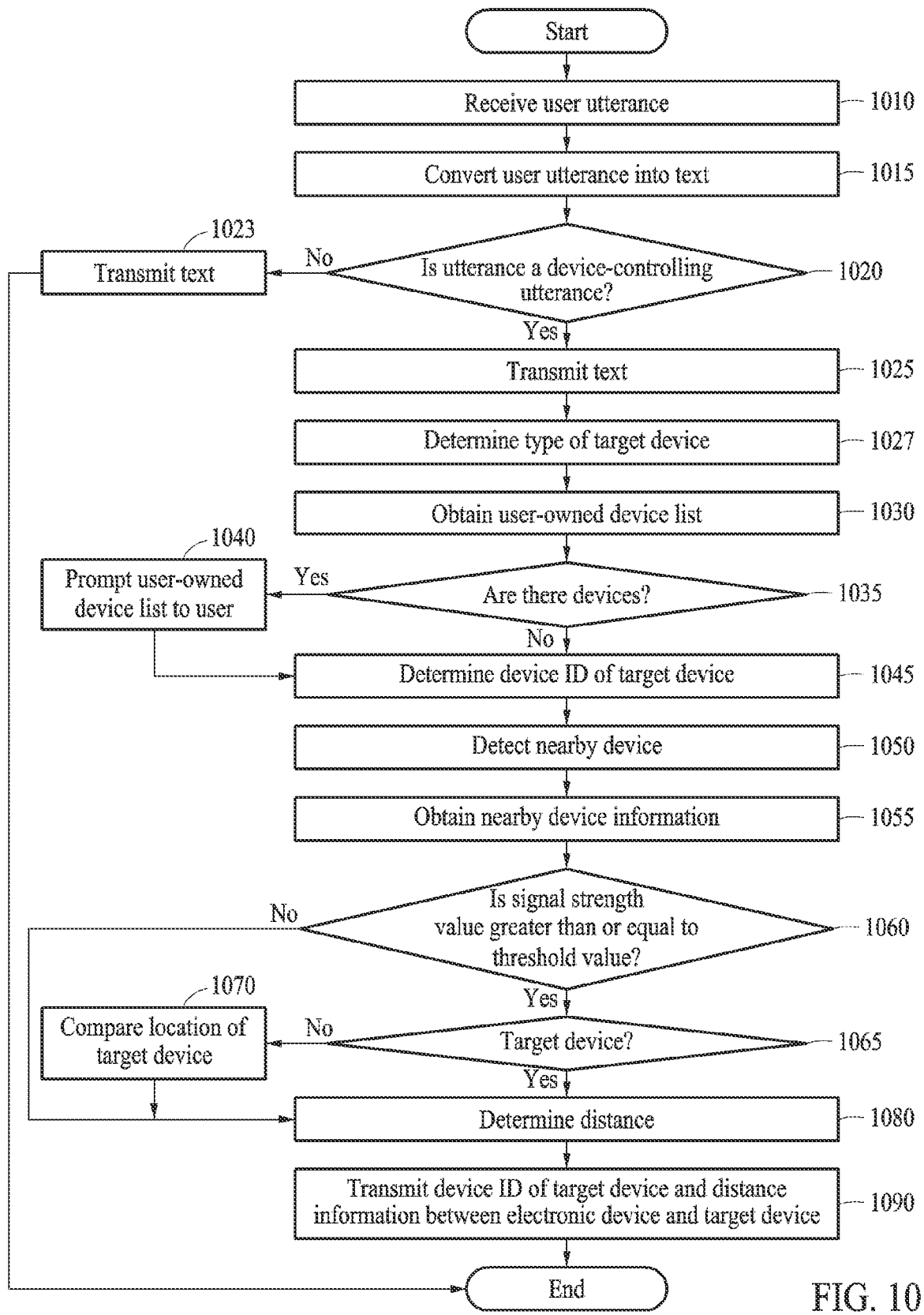
FIG. 10 is a flowchart illustrating an example method of determining a distance between an electronic device and a target device according to various example embodiments.

FIG. 10 is a flowchart illustrating an example method of determining a distance between an electronic device and a target device according to various example embodiments.

Operations 1010 through 1080 to be described hereinafter with reference to FIG. 10 may be performed to determine a distance between the electronic device 501 and the target device 503 in the electronic device 501. Operations 1010 through 1080 may be performed by the ASR module 550, the device dispatcher 560, the device selection module 580, the nearby device detection module 570, and the distance decision module 590 in the electronic device 501. Operations 1010 through 1080 may be performed in sequential order but not be necessarily performed in sequential order. For example, the order of operations 1010 through 1080 may be changed and at least two of operations 1010 through 1080 may be performed in parallel.

In operation 1010, the electronic device 501 may receive an utterance (e.g., "What movies are on TV?") from a user. In operation 1015, the electronic device 501 may convert the utterance into a computer-readable text by performing ASR on the utterance of the user. For example, the electronic device 501 may perform the ASR on the utterance using an acoustic model (AM) or a language model (LM).

In operation 1020, the electronic device 501 may determine whether the utterance of the user is a device-controlling utterance for the target device 503 by detecting a predetermined pattern (e.g., device-related words or phrases) from the text. For example, when the text obtained through the conversion from the utterance of the user is "What movies are on TV?," the electronic device 501 may determine the utterance to be the device-controlling utterance through a pattern corresponding to "on TV." The electronic device 501 may also determine whether the utterance of the user is the device-controlling utterance for the target device 503 by inferring an intent in the text.

In operations 1023 and 1025, the electronic device 501 may transmit, to the dialog system 601, the text obtained through the conversion from the utterance of the user. When the utterance of the user is not determined to be the device-controlling utterance in operation 1020, the electronic device 501 may not perform operations 1030 through 1090 subsequent to operation 1020.

In operation 1027, the electronic device 501 may determine a type (e.g., DeviceType: TV) of the target device 503 using the intent inferred from the text.

In operation 1030, the electronic device 501 may obtain a user-owned device list of the user corresponding to the type of the target device 503 from the IoT server 602 using the type of the target device 503. For example, the electronic device 501 may transmit the type of the target device 503 to the IoT server 602. The IoT server 602 may then verify a device (e.g., TV) possessed by the user corresponding to the type of the target device 503, generate the user-owned device list including an ID of the device (e.g., TV) possessed by the user, and transmit the user-owned device list to the electronic device 501. In this example, the type of the target device 503 may be determined using the intent inferred from the text.

In operation 1035, the electronic device 501 may determine whether there is a plurality of user-owned devices corresponding to the type of the target device 503 using the user-owned device list.

In operation 1040, in the presence of the plurality of the user-owned devices, the electronic device 501 may prompt the user-owned device list to the user. The user may select the target device 503 which is a target for remote control from the prompted user-owned device list. When there is a single user-owned device, operation 1040 may be omitted.

In operation 1045, the electronic device 501 may determine a device ID of the target device 503. For example, when there is a single user-owned device corresponding to the type of the target device 503, the electronic device 501 may determine an ID of the single device included in the user-owned device list to be the device ID of the target device 503. For another example, when there is a plurality of user-owned devices corresponding to the type of the target device 503 on the user-owned device list, the electronic device 501 may determine, to be the device ID of the electronic device 503, an ID of a device selected by the user from the prompted user-owned device list.

In operation 1050, the electronic device 501 may detect at least one nearby device located around the electronic device 501 based on a location of the electronic device 501. For example, the electronic device 501 may broadcast a location information request for detecting the nearby device located around the electronic device 501.

In operation 1055, the electronic device 501 may obtain nearby device information transmitted from the nearby device in response to the location information request. The electronic device 501 may generate a detected device list including detected devices based on the obtained nearby device information.

In operation 1060, the electronic device 501 may calculate a signal strength value of a signal included in device location information obtained from each detected device, and determine whether there is a device having a signal strength value greater than or equal to a threshold value.

In operation 1065, when there is the device having the signal strength value greater than or equal to the threshold value, the electronic device 501 may determine whether the device having the signal strength value greater than or equal to the threshold value is the target device 503.

In operation 1070, when it is determined that the device having the signal strength value greater than or equal to the threshold value is not the target device 503, the electronic device 501 may compare a location (e.g., a registered location) of the device having the signal strength value greater than or equal to the threshold value and a location (e.g., a registered location) of the target device 503 using Wi-Fi connection information and/or registered location information of the device location information obtained from the device having the signal strength value greater than or equal to the threshold value.

In operation 1080, the electronic device 501 may determine whether a distance between the electronic device 501 and the target device 503 is a short distance or a long distance. When it is determined that there is no device having the signal strength value greater than or equal to the threshold value in operation 1060, the electronic device 501 may determine the distance between the electronic device 501 and the target device 503 to be a long distance. When it is determined that the device having the signal strength value greater than or equal to the threshold value is the target device 503 in operation 1065, the electronic device 501 may determine the distance between the electronic device 501 and the target device 503 to be a short distance. When the location of the device having the signal strength value greater than or equal to the threshold value is verified to be the same as the location of the target device 503 in operation 1070, the electronic device 501 may determine the distance between the electronic device 501 and the target device 503 to be a short distance. When the location of the device having the signal strength value greater than or equal to the threshold value is verified to be different from the location of the target device 503 in operation 1070, the electronic device 501 may determine the distance between the electronic device 501 and the target device 503 to be a long distance.

In operation 1090, the electronic device 501 may transmit, to the dialog system 601, the ID of the target device 503 and distance information (e.g., information on whether the distance is a short or long distance) associated with the distance between the electronic device 501 and the target device 503.

Figure 11:
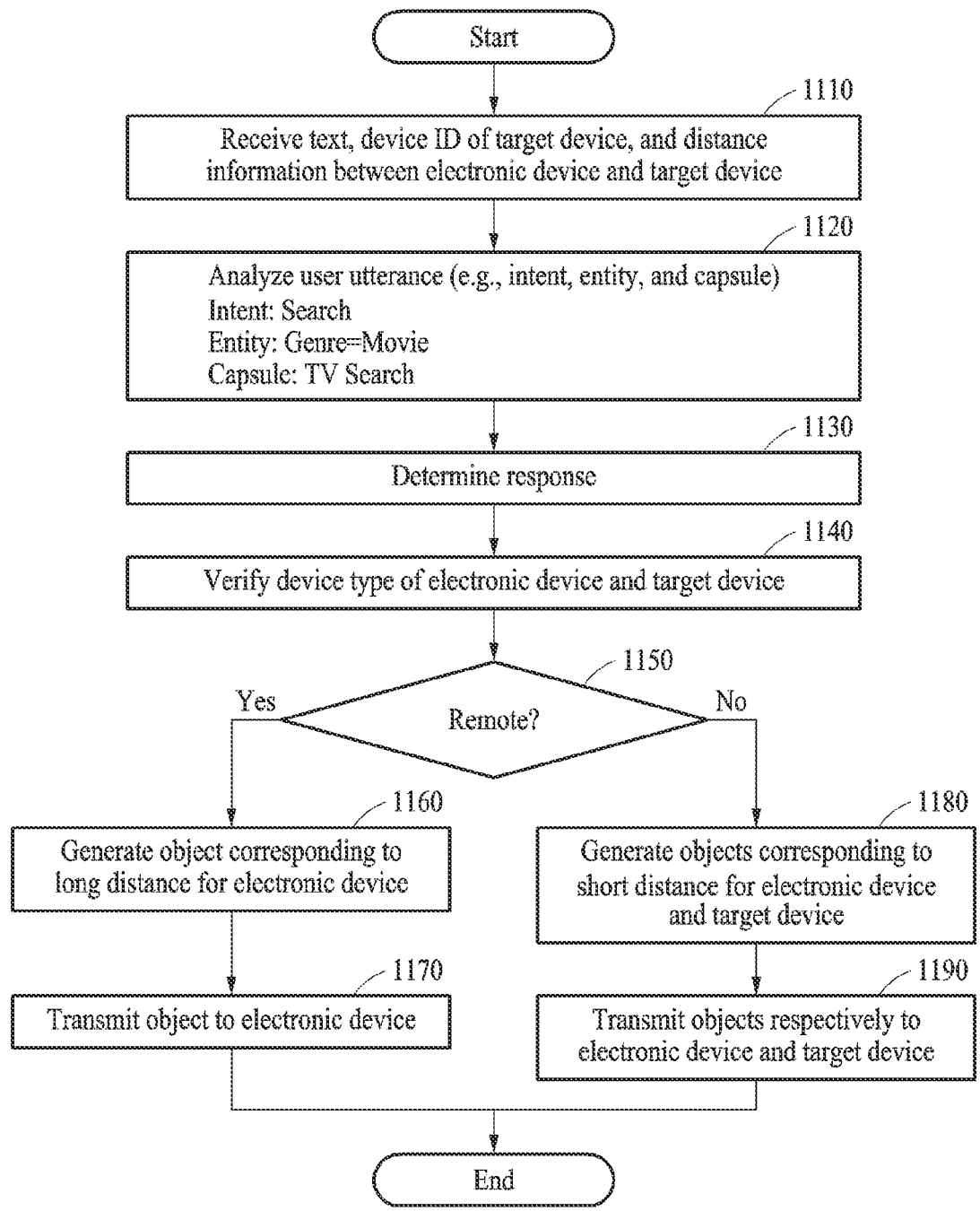
FIG. 11 is a flowchart illustrating an example method of generating and providing an object based on a distance between an electronic device and a target device according to various example embodiments.

FIG. 11 is a flowchart illustrating an example method of generating and providing an object based on a distance between an electronic device and a target device according to various example embodiments.

Operations 1110 through 1190 to be described hereinafter with reference to FIG. 11 may be performed to generate an object based on a distance (e.g., a short or long distance)

between the electronic device 501 and the target device 503. Operations 1110 through 1190 may be performed by the NLU model 610 and the dialog manager 620 of the dialog system 601. Operations 1110 through 1190 may be performed in sequential order but not be necessarily performed in sequential order. For example, the order of operations 1110 through 1190 may be changed and at least two of operations 1110 through 1190 may be performed in parallel.

In operation 1110, the dialog system 601 may receive, from the electronic device 501, a text (e.g., a text obtained through a conversion from an utterance of a user), a device ID of the target device 503, and distance information associated with a distance between the electronic device 501 and the target device 503. The distance information may include, for example, information on whether the distance between the electronic device 501 and the target device 503 is a short distance or a long distance.

In operation 1120, the dialog system 601 may determine an intent, an entity, and a capsule associated with the utterance of the user by analyzing the text.

In operation 1130, the dialog system 601 may determine a response to be transmitted to the user using the analyzed intent, entity, and capsule.

In operation 1140, the dialog system 601 may verify a type (e.g., a device type) of the electronic device 501 and the target device 503. The type of the electronic device 501 may be verified in the dialog system 601 when the electronic device 501 is connected to the dialog system 601, for example, through session connection. The type of the target device 503 may be verified based on the device ID of the target device 503.

In operation 1150, the dialog system 601 may determine whether the distance between the electronic device 501 and the target device 503 is a short distance or a long distance based on the distance information.

Operations 1160 and 1170 may be performed when the distance between the electronic device 501 and the target device 503 is verified to be remote (e.g., a long distance). In operation 1160, the dialog system 601 may generate an object corresponding to the long distance for the electronic device 501 based on the device type of the electronic device 501. In operation 1170, the dialog system 601 may transmit the generated object to the electronic device 501. In this case, the dialog system 601 may also transmit a response determined in operation 1120.

Operations 1180 and 1190 may be performed when the distance between the electronic device 501 and the target device 503 is verified to be near (e.g., a short distance). In operation 1180, the dialog system 601 may generate an object corresponding to the short distance for the electronic device 501 based on the device type of the electronic device 501 and generate an object corresponding to the short distance for the target device 503 based on the device type of the target device 503. In operation 1190, the dialog system 601 may transmit the generated objects respectively to the electronic device 501 and the target device 503.

Figure 12:
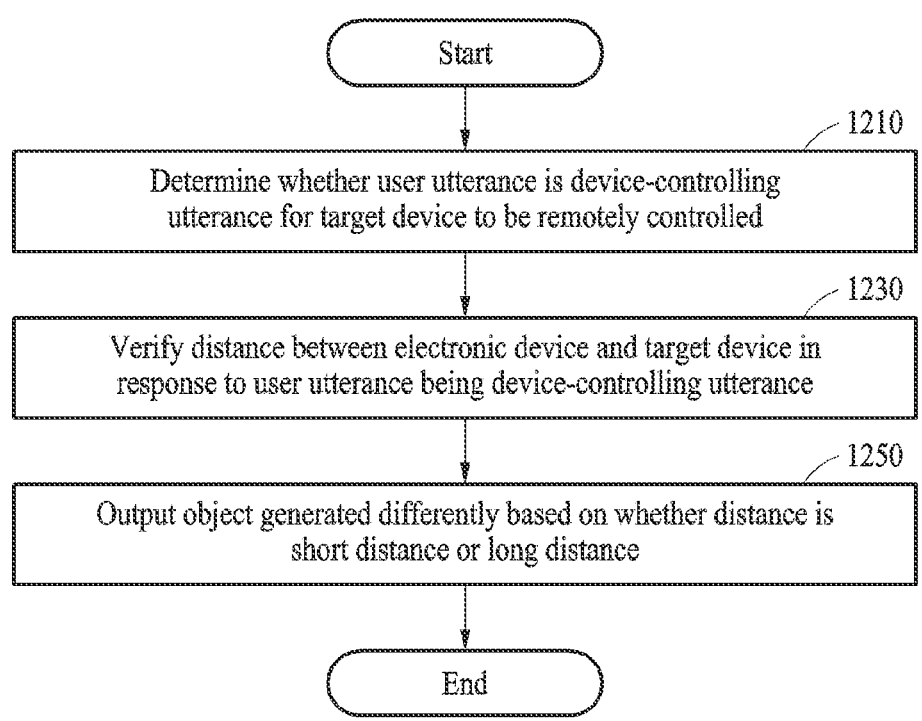
FIG. 12 is a flowchart illustrating an example method of operating an electronic device according to various example embodiments.

FIG. 12 is a flowchart illustrating an example method of operating an electronic device according to various example embodiments.

Operations 1210 through 1250 to be described hereinafter with reference to FIG. 12 may be performed for an electronic device (e.g., the electronic device 501) to output an object based on a distance (e.g., a short or long distance) between the electronic device 501 and a target device (e.g., the target device 503). Operations 1210 through 1250 may be performed in sequential order but not be necessarily performed in sequential order. For example, the order of operations 1210 through 1250 may be changed, and at least two of operations 1210 through 1250 may be performed in parallel.

In operation 1210, the electronic device 501 may receive an utterance of a user and determine whether the utterance is a device-controlling utterance for the target device 503 to be remotely controlled. For example, the electronic device 501 may determine whether the utterance of the user is the device-controlling utterance for the target device 503 based on a predetermined pattern (e.g., a device-related word or phrase) extracted from a text obtained through a conversion from the utterance of the user. For another example, the electronic device 501 may determine whether the utterance of the user is the device-controlling utterance for the target device 503 based on an intent inferred from the text obtained through the conversion from the utterance of the user.

In operation 1230, when the utterance of the user is the device-controlling utterance, the electronic device 501 may verify a distance between the electronic device 501 and the target device 503. For example, the electronic device 501 may detect a nearby device (e.g., the nearby device 502 and the target device 503) located around the electronic device 501, obtain (or measure) device location information from the nearby device (e.g., 502 and 503), and determine whether the distance between the electronic device 501 and the target device 503 is a short distance or a long distance using the obtained device location information.

In operation 1250, the electronic device 501 may output an object generated differently based on whether the verified distance is a short distance or a long distance. For example, when the distance between the electronic device 501 and the target device 503 is a short distance, the electronic device 501 may output an object generated according to the short distance, and the target device 503 may also output an object generated according to the short distance. In contrast, when the distance between the electronic device 501 and the target device 503 is a long distance, only the electronic device 501 may output an object generated according to the long distance. The object generated according to the long distance and outputted from the electronic device 501 may be the object generated according to the short distance and outputted from the target device 503.

According to various example embodiments, an electronic device (e.g., the electronic device 501 of FIG. 5) may include: a memory (e.g., the memory 530 of FIG. 6) storing therein instructions, and a processor (e.g., the processor 520 of FIG. 6) electrically connected to the memory and configured to execute the instructions. When the instructions are executed by the processor, the processor may: determine whether an utterance is a device-controlling utterance for a target device (e.g., the target device 503 of FIG. 5) to be remotely controlled, verify a distance between the electronic device and the target device, and output an object generated differently based on whether the distance is a distance less than or equal to a specified threshold distance or a long distance greater than the specified threshold distance.

The processor may: detect a nearby device (e.g., the nearby device 502 of FIG. 5 and the target device 503) located within a specified proximity of the electronic device, determine a distance between the nearby device and the electronic device, and determine the distance between the electronic device and the target device using the distance between the nearby device and the electronic device.

When the utterance is the device-controlling utterance, the processor may control the electronic device to broadcast a location information request for detecting the nearby device.

The processor may receive device location information transmitted from the nearby device in response to the location information request, and determine whether the distance between the nearby device and the electronic device is a short distance less than or equal to a specified distance or a long distance greater than the specified distance based on the device location information.

The device location information may include at least one of an ultra-wide band (UWB) signal, a Bluetooth low energy (BLE) signal, Wi-Fi connection information, and registered location information.

The processor may convert the utterance into a text by performing automatic speech recognition (ASR) on the utterance of the user, and determine whether the utterance is the device-controlling utterance based on the text.

The processor may determine a type of the target device based on the text.

The processor may select the target device from a user-owned device list corresponding to the type of the target device.

The processor may prompt the user-owned device list to a user.

According to various example embodiments, a method of operating an electronic device (e.g., the electronic device 501 of FIG. 5) may include: determining whether an utterance is a device-controlling utterance for a target device (e.g., the target device 503 of FIG. 5) to be remotely controlled, verifying a distance between the electronic device and the target device in response to the utterance being the device-controlling utterance, and outputting an object generated differently based on whether the distance is a short distance less than or equal to a specified distance or a long distance greater than the specified distance.

The verifying of the distance may include detecting a nearby device (e.g., the nearby device 502 of FIG. 5 and the target device 503) located within a specified proximity of the electronic device, determining a distance between the nearby device and the electronic device, and determining the distance between the electronic device and the target device using the distance between the nearby device and the electronic device.

The determining of the distance may include broadcasting a location information request for detecting the nearby device in response to the utterance being the device-controlling utterance.

The determining of the distance may include receiving device location information transmitted from the nearby device in response to the location information request, and determining whether the distance between the nearby device and the electronic device is a short distance less than or equal to a specified distance or a long distance greater than the specified distance based on the device location information.

The device location information may include at least one of an ultra-wide band (UWB) signal, a Bluetooth low energy (BLE) signal, Wi-Fi connection information, and registered location information.

The determining of whether the utterance of the user is the device-controlling utterance may include converting the utterance into a text through automatic speech recognition (ASR) on the utterance, and determining whether the utterance is the device-controlling utterance based on the text.

The method may further include determining a type of the target device based on the text.

The method may further include selecting the target device from a user-owned device list of the user corresponding to the type of the target device.

The method may further include prompting the user-owned device list to a user.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   memory storing instructions; and
   at least one processor electrically connected to the memory,
   wherein the instructions, when executed by the at least one processor, cause the electric device to:
   determine whether an utterance is a device-controlling utterance for a target device to be remotely controlled;
   based on the utterance being the device-controlling utterance, verify a distance between the electronic device and the target device; and
   output an object generated differently based on whether the distance is a first short distance less than or equal to a first specified distance or a first long distance greater than the first specified distance, and
   wherein the instructions, when executed by the at least one processor, cause the electronic device to:
   detect a nearby device located within a specified proximity of the electronic device and determine a distance between the nearby device and the electronic device; and
   determine the distance between the electronic device and the target device using the distance between the nearby device and the electronic device.

2. The electronic device of claim 1, wherein the instructions, when executed by the at least one processor, cause the electronic device to:
   based on the utterance being the device-controlling utterance, control the electronic device to broadcast a location information request for detecting the nearby device.

3. The electronic device of claim 2, wherein the instructions, when executed by the at least one processor, cause the electronic device to:
   receive device location information transmitted from the nearby device in response to the location information request; and
   determine whether the distance between the nearby device and the electronic device is a second short distance less than or equal to a second specified distance or a second long distance greater than the second specified distance based on the device location information.

4. The electronic device of claim 2, wherein the device location information comprises at least one of an ultra-wideband (UWB) signal, a Bluetooth low energy (BLE) signal, wireless-fidelity (Wi-Fi) connection information, or registered location information.

5. The electronic device of claim 1, wherein the instructions, when executed by the at least one processor, cause the electronic device to:
   convert the utterance into a text through automatic speech recognition (ASR); and determine whether the utterance is the device-controlling utterance based on the text.

6. The electronic device of claim 5, wherein the instructions, when executed by the at least one processor, cause the electronic device to:
   determine a type of the target device based on the text.

7. The electronic device of claim 6, wherein the instructions, when executed by the at least one processor, cause the electronic device to:
   select the target device from a user-owned device list of a user corresponding to the type of the target device.

8. The electronic device of claim 7, wherein the instructions, when executed by the at least one processor, cause the electronic device to:
   prompt the user-owned device list to the user.

9. A method of operating an electronic device, comprising:
   determining whether an utterance is a device-controlling utterance for a target device to be remotely controlled;
   based on the utterance being the device-controlling utterance, verifying a distance between the electronic device and the target device; and
   outputting an object generated differently based on whether the distance is a first short distance less than or equal to a first specified distance or a first long distance greater than the first specified distance, and
   wherein the verifying comprises:
      detecting a nearby device located within a specified proximity of the electronic device and determining a distance between the nearby device and the electronic device; and
      determining the distance between the electronic device and the target device using the distance between the nearby device and the electronic device.

10. The method of claim 9, wherein the determining of the distance comprises:
    based on the utterance being the device-controlling utterance, broadcasting a location information request for detecting the nearby device.

11. The method of claim 10, wherein the determining of the distance further comprises:
    receiving device location information transmitted from the nearby device in response to the location information request; and
    determining whether the distance between the nearby device and the electronic device is a second short distance less than or equal to a second specified distance or a second long distance greater than the second specified distance based on the device location information.

12. The method of claim 11, wherein the device location information comprises at least one of an ultra-wideband (UWB) signal, a Bluetooth low energy (BLE) signal, wireless-fidelity (Wi-Fi) connection information, or registered location information.

13. The method of claim 9, wherein the determining of whether the utterance is the device-controlling utterance comprises:
    converting the utterance into a text through automatic speech recognition (ASR); and
    determining whether the utterance is the device-controlling utterance based on the text.

14. The method of claim 13, further comprising:
    determining a type of the target device based on the text.

15. The method of claim 14, further comprising:
    selecting the target device from a user-owned device list of a user corresponding to the type of the target device.

16. The method of claim 15, further comprising:
    prompting the user-owned device list to the user.

17. A non-transitory computer-readable storage medium storing instructions that, when executed by at least one processor of an electronic device, cause the electronic device to perform operations comprising:
    determining whether an utterance is a device-controlling utterance for a target device to be remotely controlled;
    based on the utterance being the device-controlling utterance, verifying a distance between the electronic device and the target device; and
    outputting an object generated differently based on whether the distance is a short distance less than or equal to a specified distance or a long distance greater than the specified distance, and
    wherein the verifying comprises:
       detecting a nearby device located within a specified proximity of the electronic device and determining a distance between the nearby device and the electronic device; and
       determining the distance between the electronic device and the target device using the distance between the nearby device and the electronic device.

* * * * *